US007361319B2

(12) United States Patent
Vierheilig

(10) Patent No.: US 7,361,319 B2
(45) Date of Patent: Apr. 22, 2008

(54) MIXED METAL OXIDE SORBENTS

(75) Inventor: Albert Vierheilig, Savannah, GA (US)

(73) Assignee: Intercat, Inc., Manasquan, NJ (US)

( * ) Notice: Subject to any disclaimer, the term of this patent is extended or adjusted under 35 U.S.C. 154(b) by 0 days.

(21) Appl. No.: 10/995,583

(22) Filed: Nov. 23, 2004

(65) Prior Publication Data
US 2005/0207956 A1 Sep. 22, 2005

Related U.S. Application Data

(60) Provisional application No. 60/527,258, filed on Dec. 5, 2003.

(51) Int. Cl.
B01D 53/56 (2006.01)
B01D 53/86 (2006.01)
B01D 53/94 (2006.01)

(52) U.S. Cl. ............... 423/213.2; 423/235; 423/239.1; 423/242.1; 423/244.01; 423/244.07; 423/247; 208/108; 208/113

(58) Field of Classification Search ................ 423/235, 423/239.1, 242.1, 244.01, 244.07, 247, 213.2; 208/108, 113
See application file for complete search history.

(56) References Cited

U.S. PATENT DOCUMENTS

| | | | |
|---|---|---|---|
| 3,679,763 A | 7/1972 | Livingston | |
| 3,793,003 A | 2/1974 | Othmer | |
| 3,857,921 A | 12/1974 | Tamura et al. | |
| 3,869,500 A | 3/1975 | Kominami et al. | |
| 3,894,164 A | 7/1975 | Dismukes et al. | |
| 3,988,425 A | 10/1976 | Jockel et al. | |
| 3,992,498 A | 11/1976 | Morton et al. | |
| 4,010,233 A | 3/1977 | Winter et al. | |
| 4,016,189 A | 4/1977 | Muller et al. | |
| 4,048,244 A | 9/1977 | Hayes | |
| 4,052,296 A | 10/1977 | Montagna | |
| 4,071,436 A | 1/1978 | Blanton, Jr. et al. | |
| 4,072,600 A | 2/1978 | Schwartz | |
| 4,082,520 A | 4/1978 | Baron et al. | |
| 4,093,535 A | 6/1978 | Schwartz | |
| 4,097,353 A | 6/1978 | Kishida et al. | |
| 4,131,496 A | 12/1978 | Weitzel et al. | |
| 4,147,763 A | 4/1979 | McKinzie et al. | |
| 4,153,535 A | 5/1979 | Vasalos et al. | |
| 4,162,963 A | 7/1979 | Gorin | |
| 4,173,454 A | 11/1979 | Heins | |
| 4,192,855 A | 3/1980 | Ginger | |
| 4,199,435 A * | 4/1980 | Chessmore et al. ......... 208/113 |
| 4,238,317 A | 12/1980 | Vasalos et al. | |
| 4,247,730 A | 1/1981 | Brunelle et al. | |
| 4,254,558 A | 3/1981 | Mayer | |
| 4,254,616 A | 3/1981 | Siminski et al. | |
| 4,255,403 A | 3/1981 | Mayer et al. | |
| 4,261,862 A | 4/1981 | Kinoshita et al. | |
| 4,263,020 A | 4/1981 | Eberly, Jr. | |
| 4,274,942 A | 6/1981 | Bartholic et al. | |
| 4,274,981 A | 6/1981 | Suzuki et al. | |
| 4,280,898 A | 7/1981 | Tatterson et al. | |
| 4,282,084 A | 8/1981 | Gross et al. | |
| 4,325,817 A | 4/1982 | Bartholic et al. | |
| 4,358,297 A | 11/1982 | Eberly, Jr. | |
| 4,374,819 A | 2/1983 | Palilla et al. | |
| 4,376,103 A | 3/1983 | Bertolacini et al. | |
| 4,381,993 A | 5/1983 | Nevitt | |
| 4,422,888 A | 12/1983 | Stutius | |
| 4,425,312 A | 1/1984 | Brignac | |
| 4,432,864 A | 2/1984 | Myers et al. | |
| 4,432,896 A | 2/1984 | Sugiyama et al. | |
| 4,434,044 A | 2/1984 | Busch et al. | |
| 4,452,854 A | 6/1984 | Merriam et al. | |

(Continued)

FOREIGN PATENT DOCUMENTS

| | | |
|---|---|---|
| CN | 1275435 | 12/2000 |
| EP | 0045170 | 2/1982 |
| EP | 158858 | 10/1991 |
| EP | 0263171 | 11/1992 |
| EP | 0318808 | 2/1996 |
| EP | 0740580 | 10/1999 |
| EP | 1156012 | 11/2001 |
| EP | 0636107 | 2/2002 |
| EP | 1241329 | 9/2002 |
| WO | WO-95/03876 | 2/1995 |

(Continued)

OTHER PUBLICATIONS

Taylor, Crystal Structures of Some Double Hydroxide Minerals, Mineralogical Magazine, vol. 39, No. 304, Dec. 1973, pp. 377-389.
Cavani et al., Hydrotalcite-Type Anionic Clays: Preparation, Properties and Applications, Catalysis Today, 11 (1991) pp. 173-301.
Cavani et al., Hydrotalcite-Type Anionic Clays: Preparation, Properties and Applications, Catalysis Today, 11 (1991), pp. 173-301.
Corma et al., Simultaneous Catalytic Removal of Sox and Nox with Hyrdrotalcite-derivated.
Mixed Oxides Contaning Copper, and their Possibilities to be Used in FCC Units, J. of Catalysts, vol. 170, pp. 140-149 (1997).
Shannon et al., "Hydrotatcite-derived mixed oxides containing copper: Catalysts for the removal of Nitric Oxide," J. Chem. Soc., Faraday Trans., vol. 92, pp. 4331-4336 (1996).

Primary Examiner—Elizabeth D. Wood
(74) Attorney, Agent, or Firm—Tanzina Chowdhury

(57) ABSTRACT

The present invention is directed to methods for reducing SOx, NOx, and CO emissions from a fluid stream comprising contacting said fluid stream with a compound comprising magnesium and aluminum and having an X-ray diffraction pattern displaying at least a reflection at a two theta peak position at about 43 degrees and about 62 degrees, wherein the ratio of magnesium to aluminum in the compound is from about 1:1 to about 10:1. In one embodiment, the ratio of magnesium to aluminum in the compound is from about 1:1 to about 6:1. In one embodiment, the ratio of magnesium to aluminum in the compound is from about 1.5:1 to about 10:1. In another embodiment, the invention is directed to methods wherein the ratio of magnesium to aluminum in the compound is from about 1.5:1 to about 6:1.

46 Claims, 11 Drawing Sheets

U.S. PATENT DOCUMENTS

| | | |
|---|---|---|
| 4,465,588 A | 8/1984 | Occelli et al. |
| 4,465,779 A | 8/1984 | Occelli et al. |
| 4,469,588 A | 9/1984 | Hettinger, Jr. et al. |
| 4,469,589 A | 9/1984 | Yoo et al. |
| 4,472,267 A | 9/1984 | Yoo et al. |
| 4,481,103 A | 11/1984 | Krambeck et al. |
| 4,485,184 A | 11/1984 | Hettinger, Jr. et al. |
| 4,492,677 A | 1/1985 | Yoo et al. |
| 4,492,678 A | 1/1985 | Yoo et al. |
| 4,495,304 A | 1/1985 | Yoo et al. |
| 4,495,305 A | 1/1985 | Yoo et al. |
| 4,515,683 A | 5/1985 | Beck et al. |
| 4,519,897 A | 5/1985 | De Jong et al. |
| 4,520,120 A | 5/1985 | Mitchell et al. |
| 4,521,389 A | 6/1985 | Blanton, Jr. et al. |
| 4,522,937 A | 6/1985 | Yoo et al. |
| 4,549,958 A | 10/1985 | Beck et al. |
| 4,585,632 A | 4/1986 | Schneider et al. |
| 4,602,993 A | 7/1986 | Myers |
| 4,609,537 A | 9/1986 | Tolphin et al. |
| 4,609,539 A | 9/1986 | Horecky et al. |
| 4,613,428 A | 9/1986 | Edison |
| 4,617,175 A | 10/1986 | Tolpin et al. |
| 4,622,210 A | 11/1986 | Hirschberg et al. |
| 4,642,178 A | 2/1987 | Yoo et al. |
| 4,650,564 A | 3/1987 | Occelli et al. |
| 4,692,318 A | 9/1987 | Tolpin et al. |
| 4,708,785 A | 11/1987 | Myers |
| 4,708,786 A | 11/1987 | Occelli |
| 4,728,635 A | 3/1988 | Bhattacharyya et al. |
| 4,735,705 A | 4/1988 | Burk, Jr. et al. |
| 4,744,962 A | 5/1988 | Johnson et al. |
| 4,790,982 A | 12/1988 | Yoo et al. |
| 4,824,815 A | 4/1989 | Kugler |
| 4,836,993 A | 6/1989 | Bertolacini et al. |
| 4,866,019 A | 9/1989 | van Broekhoven et al. |
| 4,883,783 A | 11/1989 | Burk, Jr. et al. |
| 4,889,615 A | 12/1989 | Chin et al. |
| 4,904,627 A | 2/1990 | Bhattacharyya |
| 4,944,865 A | 7/1990 | Occelli et al. |
| 4,946,581 A | 8/1990 | van Broekhoven et al. |
| 4,952,382 A | 8/1990 | van Broekhoven et al. |
| 4,957,718 A | 9/1990 | Yoo et al. |
| 4,963,520 A | 10/1990 | Yoo et al. |
| 4,970,191 A | 11/1990 | Schutz |
| 4,973,399 A | 11/1990 | Green et al. |
| 5,037,538 A | 8/1991 | Chin et al. |
| 5,079,203 A | 1/1992 | Pinnavaia et al. |
| 5,114,898 A | 5/1992 | Pinnavaia et al. |
| 5,130,012 A | 7/1992 | Edwards et al. |
| 5,153,156 A | 10/1992 | Schutz et al. |
| 5,174,890 A | 12/1992 | Occelli |
| 5,229,091 A | 7/1993 | Buchanan et al. |
| 5,246,899 A | 9/1993 | Bhattacharyya |
| 5,250,279 A | 10/1993 | Preston et al. |
| 5,260,240 A | 11/1993 | Guthrie et al. |
| 5,262,203 A | 11/1993 | Lesher et al. |
| 5,270,272 A | 12/1993 | Galperin et al. |
| 5,288,675 A | 2/1994 | Kim |
| 5,292,492 A | 3/1994 | Buchanan et al. |
| 5,324,416 A | 6/1994 | Cormier et al. |
| 5,346,563 A | 9/1994 | Allen et al. |
| 5,364,517 A | 11/1994 | Dieckmann et al. |
| 5,371,055 A | 12/1994 | Cormier et al. |
| 5,380,442 A | 1/1995 | Yan |
| 5,384,301 A | 1/1995 | Flytzani-Stephanopoulos et al. |
| 5,399,327 A | 3/1995 | Kim |
| 5,399,329 A | 3/1995 | Schutz et al. |
| 5,407,878 A | 4/1995 | Kim |
| 5,422,332 A | 6/1995 | Demmel |
| 5,426,083 A | 6/1995 | Bhattacharyya et al. |
| 5,429,727 A | 7/1995 | Vogt et al. |
| 5,437,783 A | 8/1995 | Cuthbert et al. |
| 5,458,861 A | 10/1995 | Buchanan et al. |
| 5,459,259 A | 10/1995 | Pinnavaia et al. |
| 5,472,677 A | 12/1995 | Farris et al. |
| 5,492,684 A | 2/1996 | Buchanan et al. |
| 5,494,879 A | 2/1996 | Jin et al. |
| 5,503,814 A | 4/1996 | Demmel |
| 5,507,980 A | 4/1996 | Kelkar et al. |
| 5,514,351 A | 5/1996 | Buchanan et al. |
| 5,514,361 A | 5/1996 | Martin et al. |
| 5,518,704 A | 5/1996 | Kelkar et al. |
| 5,545,604 A | 8/1996 | Demmel |
| 5,547,548 A | 8/1996 | Siddoway |
| 5,547,648 A * | 8/1996 | Buchanan et al. .......... 423/210 |
| 5,552,362 A | 9/1996 | Immel et al. |
| 5,559,067 A | 9/1996 | Lerner et al. |
| 5,565,181 A | 10/1996 | Dieckmann et al. |
| 5,567,224 A | 10/1996 | Kundrat |
| 5,578,286 A | 11/1996 | Martin et al. |
| 5,586,714 A | 12/1996 | Curicuta et al. |
| 5,591,417 A | 1/1997 | Buchanan et al. |
| 5,591,418 A | 1/1997 | Bhattacharyya et al. |
| 5,593,558 A | 1/1997 | Sugino et al. |
| 5,609,845 A | 3/1997 | Cimini et al. |
| 5,618,406 A | 4/1997 | Demmel |
| 5,627,123 A | 5/1997 | Kim |
| 5,652,060 A | 7/1997 | Uchida et al. |
| 5,687,565 A | 11/1997 | Modica et al. |
| 5,705,136 A | 1/1998 | Drago et al. |
| 5,723,039 A | 3/1998 | Zosimov et al. |
| 5,728,358 A | 3/1998 | Avidan et al. |
| 5,728,363 A | 3/1998 | Martin et al. |
| 5,728,364 A | 3/1998 | Martin et al. |
| 5,728,365 A | 3/1998 | Martin et al. |
| 5,728,366 A | 3/1998 | Martin et al. |
| 5,730,951 A | 3/1998 | Martin et al. |
| 5,741,469 A | 4/1998 | Bhore et al. |
| 5,750,020 A | 5/1998 | Bhattacharyya et al. |
| 5,753,198 A | 5/1998 | Ayala et al. |
| 5,762,892 A | 6/1998 | Kasahara et al. |
| 5,776,424 A | 7/1998 | Martin et al. |
| 5,792,338 A | 8/1998 | Gosling et al. |
| 5,792,436 A | 8/1998 | Feeley et al. |
| 5,805,973 A | 9/1998 | Coffinberry et al. |
| 5,814,291 A | 9/1998 | Kelkar |
| 5,843,862 A | 12/1998 | Bhattacharyya et al. |
| 5,866,496 A | 2/1999 | Albers et al. |
| 5,874,019 A | 2/1999 | Uchida et al. |
| 5,882,616 A | 3/1999 | Ziebarth et al. |
| 5,882,622 A | 3/1999 | Easley et al. |
| 5,894,035 A | 4/1999 | Cinibulk et al. |
| 5,908,804 A | 6/1999 | Menon et al. |
| 5,914,288 A | 6/1999 | Turk et al. |
| 5,914,293 A | 6/1999 | Bhattacharyya et al. |
| 5,916,129 A | 6/1999 | Modica et al. |
| 5,928,496 A | 7/1999 | Albers et al. |
| 5,928,497 A | 7/1999 | Iaccino |
| 5,939,353 A | 8/1999 | Bhattacharyya et al. |
| 5,948,726 A | 9/1999 | Moskovitz et al. |
| 5,951,851 A | 9/1999 | Poirier et al. |
| 5,955,045 A | 9/1999 | Baur et al. |
| 5,958,359 A | 9/1999 | Buchanan et al. |
| 5,965,100 A | 10/1999 | Khanmamedov |
| 5,968,870 A | 10/1999 | Iizuka et al. |
| 5,972,828 A | 10/1999 | Doi et al. |
| 5,984,997 A | 11/1999 | Bickmore et al. |
| 5,990,030 A | 11/1999 | McCauley |
| 5,998,232 A | 12/1999 | Maruska |
| 6,001,241 A | 12/1999 | Gosling et al. |
| 6,027,636 A | 2/2000 | Poirier et al. |
| 6,027,704 A | 2/2000 | Johnson et al. |
| 6,028,023 A | 2/2000 | Vierheilig |

| | | | | | | |
|---|---|---|---|---|---|---|
| 6,030,597 | A | 2/2000 | Buchanan et al. | 6,716,338 B2 | 4/2004 | Madon et al. |
| 6,074,984 | A | 6/2000 | Demmel, deceased et al. | 6,777,370 B2 | 8/2004 | Chen |
| 6,129,833 | A | 10/2000 | McCauley | 6,866,834 B2 | 3/2005 | Nakamura et al. |
| 6,129,834 | A * | 10/2000 | Peters et al. ........... 208/120.01 | 6,914,033 B2 | 7/2005 | Gislason et al. |
| 6,156,696 | A | 12/2000 | Albers et al. | 6,923,945 B2 | 8/2005 | Chen |
| 6,171,991 | B1 | 1/2001 | Stamires et al. | 6,929,736 B2 | 8/2005 | Vierheilig |
| 6,180,764 | B1 | 1/2001 | Noweck et al. | 7,067,093 B2 | 6/2006 | Vierheilig et al. |
| 6,200,445 | B1 | 3/2001 | Yokota et al. | 2003/0039597 A1 | 2/2003 | Deeba et al. |
| 6,274,530 | B1 | 8/2001 | Cayton et al. | 2003/0089640 A1 | 5/2003 | Madon et al. |
| 6,281,164 | B1 | 8/2001 | Demmel et al. | 2003/0096697 A1 | 5/2003 | Vierheilig |
| 6,306,793 | B1 | 10/2001 | Turk et al. | 2003/0203806 A1 | 10/2003 | Vierheilig |
| 6,333,290 | B1 | 12/2001 | Stamires et al. | 2004/0031730 A1 | 2/2004 | Gislason et al. |
| 6,338,830 | B1 | 1/2002 | Moskovitz et al. | 2004/0077492 A1 | 4/2004 | Yaluris et al. |
| 6,338,831 | B1 | 1/2002 | Strehlau et al. | 2004/0086442 A1 | 5/2004 | Vierheilig |
| 6,376,405 | B1 | 4/2002 | Stamires et al. | 2004/0152586 A1 | 8/2004 | Ou et al. |
| 6,419,890 | B1 | 7/2002 | Li | 2005/0038306 A1 | 2/2005 | Beech et al. |
| 6,440,887 | B1 | 8/2002 | Stamires et al. | 2005/0095188 A1 | 5/2005 | Matsumoto et al. |
| 6,468,488 | B1 | 10/2002 | Stamires et al. | 2005/0207956 A1 | 9/2005 | Vierheilig |
| 6,479,421 | B1 | 11/2002 | Vierheilig | 2005/0227058 A1 | 10/2005 | Ohashi et al. |
| 6,497,811 | B1 | 12/2002 | Myrstad et al. | 2005/0234278 A1 | 10/2005 | van Egmond et al. |
| 6,503,867 | B1 | 1/2003 | Stamires et al. | | | |
| 6,506,358 | B1 | 1/2003 | Stamires et al. | | | |

FOREIGN PATENT DOCUMENTS

| | | |
|---|---|---|
| WO | WO-95/17265 | 6/1995 |
| WO | WO-99/26714 | 6/1999 |
| WO | WO 99/42201 | 8/1999 |
| WO | WO-99/42201 | 8/1999 |
| WO | WO-02/058819 | 8/2002 |
| WO | WO-03/018178 | 3/2003 |
| WO | WO-05/060519 | 7/2005 |

| | | | |
|---|---|---|---|
| 6,514,473 | B2 | 2/2003 | Noweck et al. |
| 6,517,795 | B1 | 2/2003 | Noweck et al. |
| 6,531,052 | B1 | 3/2003 | Frye et al. |
| 6,541,409 | B1 | 4/2003 | Jones et al. |
| 6,579,820 | B2 | 6/2003 | Tamhankar et al. |
| 6,585,945 | B2 | 7/2003 | Wu et al. |
| 6,589,902 | B1 | 7/2003 | Stamires et al. |
| 6,593,265 | B2 | 7/2003 | Stamires et al. |
| 6,610,264 | B1 | 8/2003 | Buchanan et al. |
| 6,699,448 | B2 | 3/2004 | Wu et al. |

* cited by examiner

MIXED METAL OXIDE SORBENTS

This application claims the benefit of provisional application U.S. Ser. No. 60/527,258, filed Dec. 5, 2003, which is hereby incorporated by reference into the subject application in its entirety.

Throughout this application, various publications are referenced. The disclosures of these publications in their entireties are hereby incorporated by reference into this application in order to more fully describe the state of the art as known to those skilled therein as of the date of the invention described and claimed herein.

The disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention provides methods for reducing SOx, NOx and/or CO emissions from fluid streams using mixed metal oxide compounds.

BACKGROUND OF THE INVENTION

Catalytic cracking is a petroleum refining process that is applied commercially on a very large scale. A majority of the refinery gasoline blending pool in the United States is produced by this process, with almost all being produced using the fluid catalytic cracking process. In the catalytic cracking process heavy hydrocarbon fractions are converted into lighter products by reactions taking place at elevated temperature in the presence of a catalyst, with the majority of the conversion or cracking occurring in the gas phase. This hydrocarbon feedstock is thereby converted into gasoline, distillate and other liquid cracking products as well as lighter gaseous cracking products of four or fewer carbon atoms per molecule. The gas partly consists of olefins and partly of saturated hydrocarbons.

In catalytic cracking processes, hydrocarbon feedstock is injected into the riser section of a hydrocarbon cracking reactor, where it cracks into lighter, valuable products on contacting hot catalyst circulated to the riser-reactor from a catalyst regenerator. As the endothermic cracking reactions take place, heavy material known as coke is deposited onto the catalyst. This reduces the activity of the catalyst and regeneration of the catalyst is desired. The catalyst and hydrocarbon vapors are carrier up the riser to the disengagement section of the reactor, where they are separated. Subsequently, the catalyst flows into the stripping section, where the hydrocarbon vapors entrained with the catalyst are stripped by steam injection. Following removal of occluded hydrocarbons from the spent cracking catalyst, the stripped catalyst flows through a spent catalyst standpipe and into the catalyst regenerator.

Typically, catalyst regeneration is accomplished by introducing air into the regenerator and burning off the coke to restore catalyst activity. These coke combustion reactions are highly exothermic and heat the catalyst. The hot, reactivated catalyst flows through the regenerated catalyst standpipe back to the riser to complete the catalyst cycle. The coke combustion exhaust gas stream rises to the top of the regenerator and leaves the regenerator through the regenerator flue. The exhaust gas generally contains NOx, SOx, CO, oxygen, ammonia, nitrogen and $CO_2$.

The three characteristic steps of the catalytic cracking can therefore be distinguished: 1) a cracking step in which the hydrocarbons are converted into lighter products, 2) a stripping step to remove hydrocarbons adsorbed on the catalyst, and 3) a regeneration step to burn off coke from the catalyst. The regenerated catalyst is then reused in the cracking step.

The catalyst regenerator may be operated in complete combustion mode, which has now become the standard combustion mode, in partial CO combustion mode, or in a dual complete/partial combustion mode. In complete combustion operation, the coke on the catalyst is completely burned to $CO_2$. This is typically accomplished by conducting the regeneration in the presence of excess oxygen, provided in the form of excess air. The exhaust gas from complete combustion operations comprises NOx, SOx, $CO_2$, nitrogen and oxygen.

In partial carbon monoxide combustion mode operation, the catalyst regenerator is operated with insufficient air to burn all of the coke in the catalyst to $CO_2$. As a result, the coke is combusted to a mixture of CO and $CO_2$. The CO can optionally be oxidized to $CO_2$ in a downstream CO boiler. The effluent from the CO boiler comprises NOx, SOx, $CO_2$ and nitrogen.

Several approaches have been used in industry to reduce SOx, NOx and CO in crackling catalyst regenerator exhaust gases. These include capital-intensive and expensive options, such as pretreatment of reactor feed with hydrogen and flue gas post-treatment options, and less expensive options, such as the use of catalysts and catalyst additives.

An early approach used alumina compounds as additives to the cracking catalyst to adsorb sulfur oxides in the FCC regenerator; the adsorbed sulfur compounds that entered the process in the feed were released as hydrogen sulfide during the cracking portion of the cycle and passed to the product recovery section of the unit where they were removed. However, while sulfur is subsequently removed from the stack gases of the regenerator in this process, product sulfur levels are not greatly affected.

It is known in the art that NOx can be removed from the flue gas with $NH_3$, which is a selective reducing agent that does not react rapidly with excess oxygen that may be present in the flue gas. Two types of $NH_3$ processes have evolved, thermal and catalytic. Thermal processes operate as homogeneous gas-phase processes at high temperatures, typically around 1550 to 1900° F. The catalytic systems generally operate at much lower temperatures, typically at 300 to 850° F. U.S. Pat. No. 4,521,389 describes adding $NH_3$ to flue gas to catalytically reduce the NOx to nitrogen. These flue gas treatments to reduce NOx are powerful, but the capital and operating costs are high. Alternative compositions and methods for reducing NOx and CO in the flue gas of an FCC unit are described in co-pending U.S. patent application Ser. No. 10/639,688, filed Aug. 13, 2003.

Industrial facilities are continuously trying to find new and improved methods to reduce the concentration of NOx, SOx and CO from the emission of FCC units to reduce pollution in the atmosphere. The invention is directed to these and other important ends.

SUMMARY OF THE INVENTION

The present invention is directed to methods for reducing SOx, NOx, and CO emissions from a fluid stream comprising contacting the fluid stream with a compound comprising magnesium and aluminum and having an X-ray diffraction pattern displaying at least a reflection at a two theta peak position at about 43 degrees and about 62 degrees, wherein the ratio of magnesium to aluminum in the compound is from about 1:1 to about 10:1. In one embodiment, the ratio of magnesium to aluminum in the compound is from about 1:1 to about 6:1. In one embodiment, the ratio of magnesium to aluminum in the compound is from about 1.5:1 to about 10:1. In another embodiment, the ratio of magnesium to aluminum in the compound is from about 1.5:1 to about 6:1. These compounds can be used alone to reduce SOx, NOx and/or CO emissions, or can optionally be used in combination with metallic oxidants, supports, or other components to reduce SOx, NOx and/or CO emissions. These compounds can be in the form of a slurry or a shaped body. The shaped body can be a dried shaped body and/or a calcined shaped body.

DETAILED DESCRIPTION OF THE INVENTION

Figure 1:
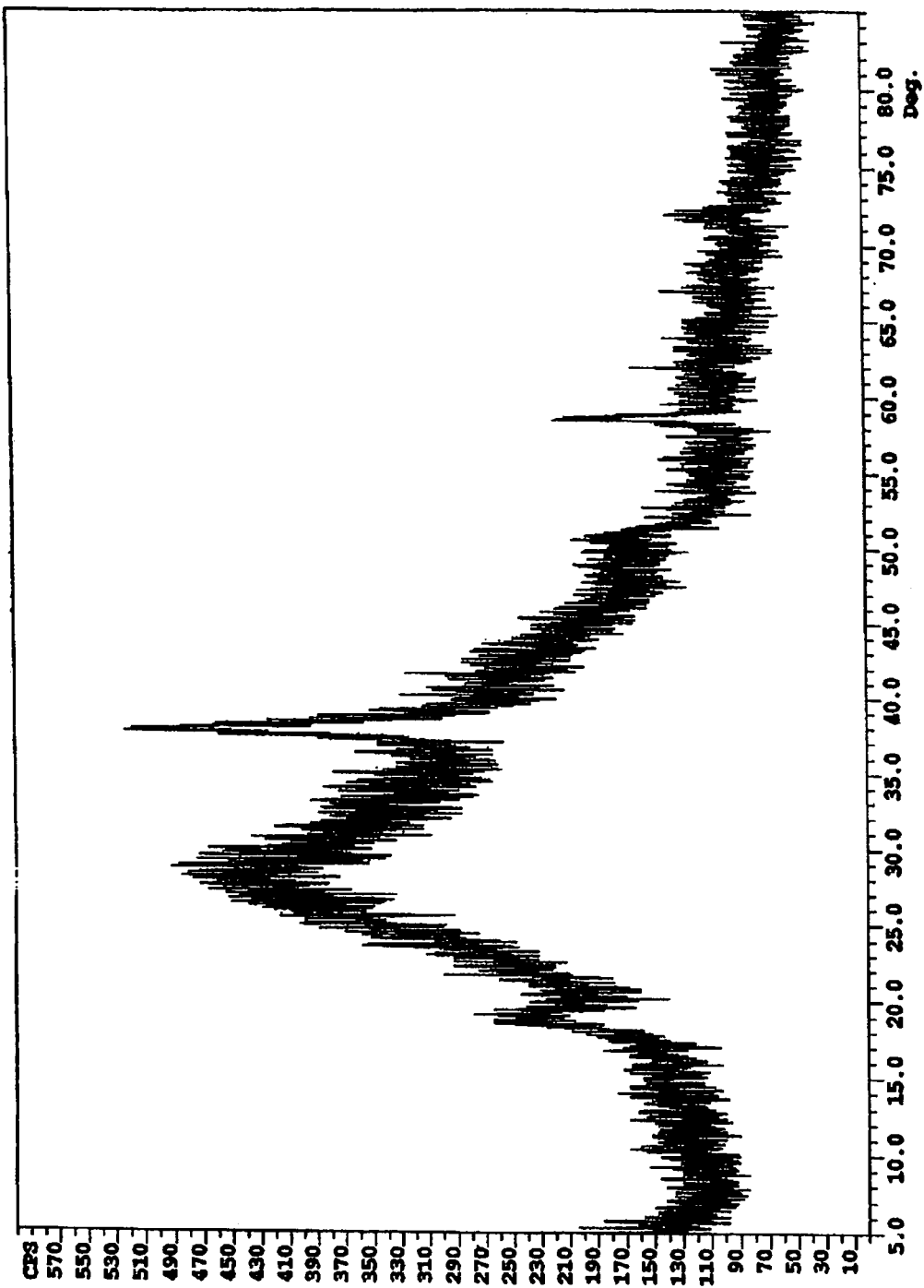
FIG. 1 is the XRD of a slurry of a magnesium aluminate compound where the ratio of Mg/Al is 2.5.

It has been unexpectedly discovered that the mixed metal oxides of the present invention, which can also be referred to as precursors, as described in U.S. Pat. No. 6,028,023, U.S. Pat. No. 6,479,421, and copending U.S. patent application Ser. No. 10/290,012, filed Nov. 7, 2002 and U.S. patent application Ser. No. 10/444,629, filed May 23, 2003, are useful to reduce SOx, NOx and/or CO emissions in a fluid stream. Thus, the present invention is directed to methods for reducing SOx, NOx, and CO emissions from a fluid stream comprising contacting the fluid stream with a compound comprising magnesium and aluminum and having an X-ray diffraction pattern displaying at least a reflection at a two theta peak position at about 43 degrees and about 62 degrees, wherein the ratio of magnesium to aluminum in the compound is from about 1:1 to about 10:1. In one embodiment, the ratio of magnesium to aluminum in the compound is from about 1:1 to about 6:1. In one embodiment, the ratio of magnesium to aluminum in the compound is from about 1.5:1 to about 10:1. In another embodiment, the ratio of magnesium to aluminum in the compound is from about 1.5:1 to about 6:1.

The term "XRD" as used herein means x-ray diffraction.

The term "FCC" as used herein means fluid catalytic cracking.

In one embodiment, the invention provides methods for reducing SOx, NOx and/or CO emissions from a fluid stream by contacting a mixed metal oxide compound with the fluid stream. In one embodiment, the mixed metal oxide compound is a magnesium aluminate compound. In another embodiment, the mixed metal oxide compound is in the form of a solid solution. In another embodiment, the mixed metal oxide is a precursor to a hydrotalcite like compound. In one embodiment, the mixed metal oxide compound is used per se as the additive to reduce SOx, NOx and/or CO emissions. In one embodiment, the mixed metal oxide compound is in the form of a shaped body. In one embodiment, the shaped bodies are dried, calcined or a mixture thereof. In another embodiment, the fluid stream is a fluid catalytic cracking unit.

In another embodiment, the invention provides methods for reducing SOx, NOx and/or CO emissions from gas streams by adding one or more shaped bodies comprising mixed metal oxide compounds and one or more metallic oxidants to the gas streams. In one embodiment, the mixed metal oxide compound is a magnesium aluminate compound. In another embodiment, the mixed metal oxide compound is in the form of a solid solution. In another embodiment, the mixed metal oxide is a precursor to a hydrotalcite like compound. In one embodiment, the metal in the metallic oxidant is antimony, bismuth, cadmium, cerium, chromium, cobalt, copper, dysoprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof. In another embodiment, the metal in the metallic oxidant is cobalt, copper, or a mixture thereof. In one embodiment, the shaped bodies are dried, calcined or a mixture thereof. In another embodiment, the gas stream is a fluid catalytic cracking unit.

In another embodiment, the invention provides methods for reducing SOx, NOx and/or CO emissions from gas streams by adding one or more shaped bodies comprising mixed metal oxide compounds and a support to the gas streams. In one embodiment, the mixed metal oxide compound is a magnesium aluminate compound. In another embodiment, the mixed metal oxide compound is in the form of a solid solution. In another embodiment, the mixed metal oxide is a precursor to a hydrotalcite like compound. In one embodiment, the support is a spinel, hydrotalcite like compound, magnesium acetate, magnesium nitrate, magnesium chloride, magnesium hydroxide, magnesium carbonate, magnesium formate, aluminum titanate, zinc titanate, zinc aluminate, zinc titanate/zinc aluminate, aluminum zirconate, calcium oxide, calcium aluminate, aluminum nitrohydrate, aluminum hydroxide compound, aluminum-containing metal oxide compound (e.g., other than alumina or aluminum hydroxide compounds), aluminum chlorohydrate, titania, zirconia, clay (e.g., halloysite, rectorite, hectorite, montmorillinite, synthetic montmorillinite, sepiolite, activated sepiolite, kaolin), clay phosphate material, zeolite, or a mixture of two or more thereof. In one embodiment, the shaped bodies can are dried, calcined or a mixture thereof. In another embodiment, the gas stream is a fluid catalytic cracking unit.

In another embodiment, the invention provides methods for reducing SOx, NOx and/or CO emissions from gas streams by adding one or more shaped bodies comprising mixed metal oxide compounds; one or more metallic oxidants; and a support to the gas streams. In one embodiment, the mixed metal oxide compound is a magnesium aluminate compound. In another embodiment, the mixed metal oxide compound is in the form of a solid solution. In another embodiment, the mixed metal oxide is a precursor to a hydrotalcite like compound. In one embodiment, the shaped bodies are dried, calcined or a mixture thereof. In another embodiment, the gas stream is a fluid catalytic cracking unit.

In another embodiment, the invention provides methods for reducing SOx, NOx and/or CO emissions from gas streams by adding one or more shaped bodies comprising about 99 wt % to about 1 wt % mixed metal oxide compounds and about 1 wt % to about 99 wt % hydrotalcite like compounds to the gas streams. In one embodiment, the mixed metal oxide compound is a magnesium aluminate compound. In another embodiment, the mixed metal oxide compound is in the form of a solid solution. In another embodiment, the mixed metal oxide is a precursor to a hydrotalcite like compound. In one embodiment, the shaped bodies are dried, calcined or a mixture thereof. In another embodiment, the gas stream is a fluid catalytic cracking unit.

In another embodiment, the invention provides methods for reducing SOx, NOx and/or CO emissions from gas streams by adding one or more shaped bodies comprising (i) about 99 wt % to about 1 wt % mixed metal oxide compounds, (ii) about 1 wt % to about 99 wt % hydrotalcite like compounds, and (iii) one or more metallic oxidants to the gas streams. In one embodiment, the mixed metal oxide compound is a magnesium aluminate compound. In another embodiment, the mixed metal oxide compound is in the form of a solid solution. In another embodiment, the mixed metal oxide is a precursor to a hydrotalcite like compound. In one embodiment, the metal in the metallic oxidant is antimony, bismuth, cadmium, cerium, chromium, cobalt, copper, dysoprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof. In another embodiment, the metal in the metallic oxidant is cobalt, copper, or a mixture thereof. In one embodiment, the shaped bodies are dried, calcined or a mixture thereof. In another embodiment, the gas stream is a fluid catalytic cracking unit.

In another embodiment, the invention provides methods for reducing SOx, NOx and/or CO emissions from gas streams by adding one or more shaped bodies comprising (i) about 99 wt % to about 1 wt % mixed metal oxide compounds, (ii) about 1 wt % to about 99 wt % hydrotalcite like compounds, and (iii) a support oxidants to the gas streams. In one embodiment, the mixed metal oxide compound is a magnesium aluminate compound. In another embodiment, the mixed metal oxide compound is in the form of a solid solution. In another embodiment, the mixed metal oxide is a precursor to a hydrotalcite like compound. In one embodiment, the support is a spinel, hydrotalcite like compound, magnesium acetate, magnesium nitrate, magnesium chloride, magnesium hydroxide, magnesium carbonate, magnesium formate, aluminum titanate, zinc titanate, zinc aluminate, zinc titanate/zinc aluminate, aluminum zirconate, calcium oxide, calcium aluminate, aluminum nitrohydrate, aluminum hydroxide compound, aluminum-containing metal oxide compound (e.g., other than alumina or aluminum hydroxide compounds), aluminum chlorohydrate, titania, zirconia, clay (e.g., halloysite, rectorite, hectorite, montmorillinite, synthetic montmorillinite, sepiolite, activated sepiolite, kaolin), clay phosphate material, zeolite, or a mixture of two or more thereof. In one embodiment, the shaped bodies are dried, calcined or a mixture thereof. In another embodiment, the gas stream is a fluid catalytic cracking unit.

In another embodiment, the invention provides methods for reducing SOx, NOx and/or CO emissions from gas streams by adding one or more shaped bodies comprising (i) about 99 wt % to about 1 wt % mixed metal oxide compounds, (ii) about 1 wt % to about 99 wt % hydrotalcite like compounds, (iii) one or more metallic oxidants, and (iv) a support to the gas streams. In one embodiment, the mixed metal oxide compound is a magnesium aluminate compound. In another embodiment, the mixed metal oxide compound is in the form of a solid solution. In another embodiment, the mixed metal oxide is a precursor to a hydrotalcite like compound. In one embodiment, the shaped bodies are dried, calcined or a mixture thereof. In another embodiment, the gas stream is a fluid catalytic cracking unit.

In some embodiments of the invention described herein, the metallic oxidants are present in an amount up to about 50% by weight; from about 0.1% by weight to about 40% by weight; from about 1% by weight to about 30% by weight; from about 1% by weight to about 25% by weight; from about 1% by weight to about 20% by weight; from about 1% by weight to about 15% by weight; or from about 1% by weight to about 10% by weight, calculated as the oxide equivalent. In one embodiment, the solid support is present in an amount up to about 50% by weight; from about 1% by weight to about 30% by weight; from about 1% by weight to about 20% by weight; from about 1% by weight to about 15% by weight; from about 1% by weight to about 10% by weight; or from about 1% by weight to about 5% by weight.

These and other aspects of the invention are described in more detail below. In one embodiment, the invention provides methods for reducing SOx, NOx and/or CO emission from gas streams (e.g., FCC units) by adding mixed metal oxide compounds to the gas streams. In one embodiment, the mixed metal oxide compounds are in the form of shaped bodies. In another embodiment, the shaped bodies are dried shaped bodies and/or calcined shaped bodies.

In another embodiment, the invention provides methods for reducing SOx, NOx and/or CO emission from gas streams (e.g., FCC units) by adding compositions comprising mixed metal oxide compounds to the gas streams. In one embodiment, the composition is a SOx, NOx and/or CO absorbent. In another embodiment, the composition is in the form of shaped bodies, such as dried shaped bodies and/or calcined shaped bodies. In one embodiment, the composition optionally further comprises one or more metallic oxidants and/or supports.

To reduce the NOx from the flue gas, the compositions comprising mixed metal oxide compounds of the invention are introduced into an FCC regenerator and are continuously cycled between the FCC reactor and the regenerator. The compositions of the invention can be used in an unexpectedly small amount to reduce NOx and CO emissions. For example, the compositions of the invention can be used in an amount of about 1 ppm to about 1000 ppm, from about 2 ppm to about 500 ppm; from about 50 ppm to about 250 ppm; or from about 100 ppm to about 200 ppm. Alternatively, the compositions of the invention can be used in an amount of about 0.001 weight % to about 5 weight % of the circulating inventory of the total catalyst in the FCC regenerator; in an amount of about 0.001 weight % to about 1 weight % of the circulating inventory of the total catalyst in the FCC regenerator; or from about 0.01 weight % to about 0.1 weight % of the circulating inventory of the total catalyst in the FCC regenerator. The compositions of the invention can reduce the NOx and/or CO emissions from an FCC unit in about two hours or less; about one hour or less; about thirty minutes or less; about fifteen minutes or less; or about 5 minutes or less.

In another embodiment, the compositions of the invention reduce CO emissions from the regenerator of an FCC unit and/or from the flue gas in the flue of the FCC unit. In one embodiment, the invention provides flue gas treatments for reducing CO in the flue of an FCC unit by adding a composition comprising copper and/or cobalt and a carrier to the regenerator of the FCC unit. In another embodiment, the invention provides methods for reducing CO emissions from the regenerator of the FCC unit by adding a composition comprising copper and/or cobalt and a carrier to the regenerator of the FCC unit. In yet another embodiment, the invention provides methods for reducing CO in the flue of an FCC unit and for reducing CO emissions from the regenerator of the FCC unit by adding a composition comprising copper and/or cobalt and a carrier to the regenerator of the FCC unit. The carrier can be a hydrotalcite like compound, a spinel, alumina, silica, calcium aluminate, aluminum silicate, aluminum titanate, zinc titanate, aluminum zirconate, magnesium aluminate, aluminum hydroxide, an aluminum-containing metal oxide compound other than $Al_2O_3$, clay, magnesia, lanthana, zirconia, titania, a clay/phosphate material, magnesium acetate, magnesium nitrate, magnesium chloride, magnesium hydroxide, magnesium carbonate, magnesium formate, hydrous magnesium silicate, magnesium silicate, magnesium calcium silicate, boria, calcium silicate, calcium oxide, aluminum nitrohydrate, aluminum chlorohydrate, silica/alumina, zeolites (e.g., ZSM-5), or a mixture of two or more thereof. In one embodiment, the carrier is a hydrotalcite like compound, a spinel, alumina, zinc titanate, zinc aluminate or zinc titanate/zinc aluminate.

In another embodiment, the compositions of the invention can be used in conjunction with a CO combustion promoter, such as a platinum and/or alumina CO combustion promoter. From 0.01 to 100 weight ppm Pt metal, based on the inventory of the regenerator, may be used with good results. Very good results can be obtained with as little as 0.1 to 10 weight ppm platinum present on the catalyst in the unit.

Any conventional FCC feed can be used in the FCC unit. The feeds may range from the typical, such as petroleum distillates or residual stocks, either virgin or partially refined, to the atypical, such as coal oils and shale oils. The feed frequently will contain recycled hydrocarbons, such as light and heavy cycle oils which have already been subjected to cracking. Preferred feeds are gas oils, vacuum gas oils, atmospheric resids, and vacuum resids. Any commercially available FCC catalyst may be used. The catalyst can be 100% amorphous, but preferably includes some zeolite in a porous refractory matrix such as silica-alumina, clay, or the like. The zeolite is usually about 5 to about 40 weight % of the catalyst, with the rest being matrix. Conventional zeolites such as Y zeolites, or aluminum deficient forms of these zeolites, such as dealuminized Y, ultrastable Y and ultrahydrophobic Y may be used. The zeolites may be stabilized with rare earths, for example, in an amount of about 0.1 to about 10 weight %.

Relatively high silica zeolite containing catalysts can be used in the invention. They withstand the high temperatures usually associated with complete combustion of CO to $CO_2$ within the FCC regenerator. Such catalysts include those containing about 10 to about 40% ultrastable Y or rare earth ultrastable Y.

The catalyst inventory may also contain one or more additives, either present as separate additive particles, or mixed in with each particle of the cracking catalyst. Additives can be added to enhance octane, such as medium pore size zeolites, e.g., ZSM-5 and other materials having a similar crystal structure.

Conventional riser cracking conditions may be used. Typical riser cracking reaction conditions include catalyst/oil ratios of about 0.5:1 to about 15:1 and a catalyst contact time of about 0.1 to about 50 seconds, and riser top temperatures of about 900 to about 1050° F. It is important to have good mixing of feed with catalyst in the base of the riser reactor, using conventional techniques such as adding large amounts of atomizing steam, use of multiple nozzles, use of atomizing nozzles and similar technology. The base of the riser may comprise a riser catalyst acceleration zone. It is preferred to have the riser reactor discharge into a closed cyclone system for rapid and efficient separation of cracked products from spent catalyst.

The compounds, compositions and/or shaped bodies of the invention can be made by the methods described in U.S. Pat. No. 6,028,023. In one embodiment, the compounds, compositions and shaped bodies are made by the following process:

(a) reacting a mixture comprising at least one divalent metal compound and at least one trivalent metal compound to produce a mixed metal oxide compound in the form of a slurry;

(b) heat treating the mixed metal oxide compound slurry from step (a) at a temperature up to about 225° C. to produce a heat-treated mixed metal oxide compound in the form of a slurry;

(c) drying the heat-treated compound from step (b) to produce one or more shaped bodies of the mixed metal oxide compound; and, optionally, (d) heat treating the compound from step (c) at a temperature of about 300° C. or higher to produce one or more calcined shaped bodies of a mixed metal oxide compound.

In one embodiment, the mixture is an aqueous mixture and the slurry is an aqueous slurry.

Steps (a)-(d) can be conducted in a continuous and/or batch wise manner. The terms "aqueous slurry" and "slurry" include, for example, sol solutions, gels and pastes. In the methods of making the shaped bodies of the mixed metal oxide compounds of the invention, a solvent can optionally be added to the slurry during the heat treatment of step (b). The solvent can be, for example, acetic acid, propionic acid, formic acid, butyric acid, valeric acid, nitric acid, ammonium hydroxide, water, and the like. In one embodiment, the solvent is acetic acid.

The divalent metal cation in the divalent metal compound can be, for example, $Mg^{2+}$, $Ca^{2+}$, $Zn^{2+}$, $Mn^{2+}$, $Co^{2+}$, $Ni^{2+}$, $Sr^{2+}$, $Ba^{2+}$, $Cu^{2+}$ or a mixture of two or more thereof. In one embodiment, the divalent metal cation is $Mg^{2+}$. Divalent metal compounds are well known in the art. Exemplary divalent metal compounds containing $Mg^{2+}$ include magnesium oxide, magnesium hydroxy acetate, magnesium acetate, magnesium hydroxide, magnesium nitrate, magnesium hydroxide, magnesium carbonate, magnesium formate, magnesium chloride, magnesium aluminate, hydrous magnesium silicate, magnesium calcium silicate, magnesium-containing clays (e.g., dolomite, saponite, sepiolite) and mixtures of two or more thereof.

The trivalent metal cation in the trivalent metal compound can be, for example, $Al^{3+}$, $Mn^{3+}$, $Fe^{3+}$, $Co^{3+}$, $Ni^{3+}$, $Cr^{3+}$, $Ga^{3+}$, $B^{3+}$, $La^{3+}$, $Gl^{3+}$ or a mixture of two or more thereof. In one embodiment, the trivalent metal cation is $Al^{3+}$. Trivalent metal compounds are well known in the art. Exemplary trivalent metal compounds containing $Al^{3+}$ include aluminum hydroxide hydrate, aluminum oxide, aluminum acetate, aluminum nitrate, aluminum hydroxide, aluminum carbonate, aluminum formate, aluminum chloride, hydrous aluminum silicate, aluminum calcium silicate, transition alumina, aluminum trihydrate (e.g., gibbsite, bayerite, calcined alumina) alumina sols, amorphous alumina, pseudoboehmite, aluminum-containing clays (e.g., kaolin, sepiolite, hydrotalcite, bentonite, metakaolin), sodium aluminate, and mixtures of two or more thereof.

In the mixed metal oxide compounds of the invention, the ratio of the divalent metal cation (e.g., $Mg^{2+}$) to the trivalent metal cation (e.g., $Al^{3+}$) can be from about 1:1 to about 10:1; from about 1.1:1 to about 6:1; about 1.2:1 to about 5:1; about 1.3:1 to about 5:1; about 1.4:1 to about 5:1; about 1.5:1 to about 5:1; about 1.6:1 to about 5:1; about 1.7:1 to about 5:1; about 1.8:1 to about 5:1; about 1.9:1 to about 5:1; or about 2:1 to about 5:1.

Prior to step (a), the divalent metal compound can be prepared in the form of a slurry, and the trivalent metal compound can be prepared in the form of a slurry. The divalent metal compound and the trivalent metal compound can be separately prepared in the form of a slurry, and then mixed together; or a mixture containing the divalent metal compound and the trivalent metal compound can be prepared by simultaneously or concurrently mixing the compounds together in the form of a slurry.

In one embodiment, the aqueous reaction mixture in step (a) can further comprise one or more other metal components such as metals of antimony, bismuth, cadmium, cerium, chromium, cobalt, copper, dysoprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof. The metals can be in an elemental state and/or can be in the form of metal oxides, metal sulfides, metal halides, or mixtures of two or more thereof. In one embodiment, the aqueous reaction mixture further comprises copper (e.g., CuO), cobalt (e.g., CoO), vanadium (e.g., $V_2O_5$), titanium ($TiO_2$), lanthanum ($La_2O_3$), cerium (e.g., $CeO_2$), tungsten, or a mixture of two or more thereof. In another embodiment, the aqueous reaction mixture further comprises copper (e.g., CuO), cobalt (CoO), vanadium (e.g., $V_2O_5$), cerium (e.g., $CeO_2$), or a mixture of two or more thereof. The one or more metal components (or oxide, sulfides, and/or halides thereof) can be present in the aqueous reaction mixture in an amount up to about 40% by weight; or from about 1% to about 25% by weight; or from about 2% to about 20% by weight, calculated as the oxide equivalent. The one or more other metal components can be added to the aqueous reaction mixture at the same time as the at least one divalent metal compound and the at least one trivalent metal compound are being mixed together to form the aqueous slurry.

Step (b) of heat treating the aqueous slurry can be conducted by heat treating the aqueous slurry at a temperature of about 50° C. to less than 225° C.; at a temperature of about 60° C. to about 200° C.; at a temperature of about 70° C. to about 150° C.; at a temperature of about 75° C. to about 100° C.; or at a temperature of about 80° C. to about 85° C. The low temperature heat treating step can be conducted for about 10 minutes to about 24 hours or more. The low temperature heat treatment is generally conducted in air or an inert atmosphere, and at atmospheric pressures. In one embodiment, the step of low temperature heat treatment is accomplished using steam injection, jacketing, heat coils, and/or autoclave. The low temperature heat treatment does not result in a dry compound; instead, is in the form of a heat-treated, aqueous slurry.

In another embodiment, the one or more other metal components (e.g., metals, oxides, sulfides and/or halides of antimony, bismuth, cadmium, cerium, chromium, cobalt, copper, dysoprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof) can be added to the aqueous slurry before, during and/or after step (b).

After conducting the low temperature heat treatment, the heat-treated, aqueous slurry is dried. The drying step (c) can be accomplished by, for example, spray drying, drum drying, flash drying, tunnel drying, and the like. In one embodiment, the drying step is accomplished by spray drying. Upon drying, the mixed metal oxide compound can be in the form of shaped bodies (e.g., particles, grains, pellets, powders, extrudate, spheres, granules, and mixtures of two or more thereof). The drying step is useful to create shaped bodies having particular shapes of interest. The dried mixed metal oxide compounds described herein can be used in an FCC unit to reduce SOx, NOx and/or CO emissions.

Step (d) can also be conducted at a temperature from about 300° C. to about 1,600° C.; or about 300° C. to about 850° C.; or about 400° C. to about 500° C. In other embodiments, step (d) is conducted at a temperature from about 300° C. to about 850° C.; or about 500° C. to about 850° C.; or about 550° C. to about 850° C.; or about 600° C. to about 850° C. The high temperature heat treatment is generally conducted in air at atmospheric pressures. The high temperature heat treatment step can be conducted for about 10 minutes to about 24 hours or more; from about 1 hour to about 18 hours; or from about 1 hour to about 10 hours. The high temperature heat treatment step can be conducted in air, in an inert environment, in an oxidizing environment (e.g., higher amounts of oxygen than that found in "normal" air), or in a reducing environment. In one embodiment, the high temperature heat treatment step is conducted in air. The calcined mixed metal oxide compounds described herein can be used in an FCC unit to reduce SOx, NOx and/or CO emissions.

The dried and/or calcined shaped bodies comprising mixed metal oxide compounds generally have an attrition less than 4; less than 3; less than 2.5, less than 2.4, less than 2.3, less than 2.2, or less than 2.1; preferably less than 2; less than 1.9; less than 1.8; less than 1.7, less than 1.6 or less than 1.5. In other embodiments, the attrition of the mixed metal oxide can be less than 1.4; less than 1.3; less than 1.2; less than 1.1; less than 1.0; less than 0.9; less than 0.8; or less than 0.7. The attrition of the mixed metal oxide compounds is measured by the ASTM D5757 method between the first and second hours or between the first and fifth hours.

In one embodiment, the mixed metal oxide is a solid solution magnesium aluminate comprising magnesium and aluminum in a ratio of about 1.1 to about 6:1, wherein the calcined form of the solid solution magnesium aluminate has an X-ray diffraction pattern displaying at least a reflection at a two theta peak position at about 43 degrees and about 62 degrees. In other embodiments, the ratio of magnesium to aluminum is 1.1:1 to 6:1; 1.2:1 to 5:1; 1.3:1 to 5:1; 1.4:1 to 5:1; 1.5:1 to 5:1; 1.6:1 to 5:1; 1.7:1 to 5:1; 1.8:1 to 5:1; 1.9:1 to 5:1; or 2:1 to 5:1. The composition, as a whole, can comprise magnesium in an amount of at least 38% by weight calculated as the oxide equivalent (i.e., MgO). Alternatively, the composition, as a whole, can comprise magnesium in an amount of at least 39% by weight, 40% by weight, 41% by weight, 42% by weight, 43% by weight, 44% by weight, 45% by weight, or 50% by weight, calculated as the oxide equivalent (i.e., MgO). The solid solution can be in the form of a slurry, dried shaped bodies and/or calcined shaped bodies. The solid solution can be used in the methods described herein by itself or the solid solution can be used in a composition that contains other components (e.g., metallic oxidants and/or supports).

The shaped bodies can comprise the solid solution magnesium aluminate, one or more metallic oxidants, and, optionally, a support; where the metal in the metallic oxidant is antimony, bismuth, cadmium, cerium, chromium, cobalt, copper, dysoprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof. In one embodiment, the composition comprises copper (e.g., CuO), cobalt (e.g., CoO), vanadium (e.g., $V_2O_5$), titanium ($TiO_2$), lanthanum ($La_2O_3$), cerium (e.g., $CeO_2$), tungsten, or a mixture of two or more thereof. In another embodiment, the composition comprises copper (e.g., CuO), cobalt (CoO), vanadium (e.g., $V_2O_5$), cerium (e.g., $CeO_2$), or a mixture of two or more thereof. In another embodiment, the composition comprises copper (e.g., CuO) and/or cobalt (CoO). In another embodiment, the composition comprises vanadium (e.g., $V_2O_5$) and/or cerium (e.g., $CeO_2$). The support can be a spinel and/or a hydrotalcite like compound.

In one embodiment of the invention, the magnesium aluminate compound is not derived from a spinel; is not a hydrotalcite like compound; and is not a hydrotalcite like compound. It is preferred that the magnesium aluminate compound of the invention is not derived from a hydrotalcite like compound. The compositions of the invention that comprise a magnesium aluminate compound can, however, further comprise other components, such as spinel, compounds derived from hydrotalcite like compounds and/or hydrotalcite like compounds.

In other embodiments of the invention, the invention provides methods to reduce SOx, NOx and CO emissions from an FCC unit using one or more shaped bodies comprising (i) 99 wt % to 1 wt % mixed metal oxide compounds and (ii) 1 wt % to 99 wt % hydrotalcite like compounds. In other embodiments, the shaped bodies about 95 wt % to about 20 wt % of mixed metal oxide compounds that are precursors to hydrotalcite like compounds and about 5 wt % to about 80 wt % of hydrotalcite like compounds. In another embodiment, the shaped bodies comprise about 95 wt % to about 25 wt % mixed metal oxide compounds that are precursors to hydrotalcite like compounds and about 5 wt % to about 75 wt % of hydrotalcite like compounds. In another embodiment, the shaped bodies comprise about 95 wt % to about 50 wt % of mixed metal oxide compounds that are precursors to hydrotalcite like compounds and about 5 wt % to about 50 wt % of hydrotalcite like compounds. In yet another embodiment, the shaped bodies comprise about 95 wt % to about 75 wt % of mixed metal oxide compounds that are precursors to hydrotalcite like compounds and about 5 wt % to about 25 wt % of hydrotalcite like compounds. The shaped bodies in this embodiment of the invention can optionally further comprise one or more metallic oxidants and/or supports to reduce SOx, NOx and/or CO emissions from an FCC unit.

In this embodiment of the invention, the shaped bodies can be made following the methods described in U.S. Pat. No. 6,028,023, where a hydrotalcite like compound is added during step (a) described above; before, during and/or after step (b) described above; and/or before, during and/or after step (c) described above.

Hydrotalcite like compounds are characterized by structures having positively charged layers that are separated by interstitial anions and/or water molecules. Exemplary natural minerals that are hydrotalcite like compounds include meixnerite, pyroaurite, sjogrenite, hydrotalcite, stichtite, reevesite, eardleyite, mannaseite, barbertonite and hydrocalumite. Other hydrotalcite like compounds and methods for making them are described by Cavani et al, *Catalysis Today*, 11:173-301 (1991), the disclosure of which is incorporated by reference herein in its entirety.

In other embodiments, the hydrotalcite like compound can be a compound of formula (I), (II), (III) and/or (IV):

$$(X^{2+}{}_m Y^{3+}{}_n(OH)_{2m+2n})A_{n/a}{}^{a-}\cdot bH_2O \quad\quad\quad (I)$$

$$(Mg^{2+}{}_m Al^{3+}{}_n(OH)_{2m+2n})A_{n/a}{}^{a-}\cdot bH_2O \quad\quad\quad (II)$$

$$(X^{2+}{}_m Y^{3+}{}_n(OH)_{2m+2n})OH_n{}^-\cdot bH_2O \quad\quad\quad (III)$$

$$(Mg^{2+}{}_m Al^{3+}{}_n(OH)_{2m+2n})OH_n{}^-\cdot bH_2O \quad\quad\quad (IV)$$

where X is magnesium, calcium, zinc, manganese, cobalt, nickel, strontium, barium, copper or a mixture of two or more thereof; Y is aluminum, manganese, iron, cobalt, nickel, chromium, gallium, boron, lanthanum, cerium or a mixture of two or more thereof; A is $CO_3$, $NO_3$, $SO_4$, Cl, OH, Cr, I, $SiO_3$, $HPO_3$, $MnO_4$, $HGaO_3$, $HVO_4$, $ClO_4$, $BO_3$ or a mixture of two or more thereof; a is 1, 2 or 3; b is between 0 and 10; and m and n are selected so that the ratio of m/n is about 1 to about 10.

In one embodiment, the hydrotalcite like compound is hydrotalcite, i.e., $Mg_6Al_2(OH)_{16}CO_3 \cdot 4H_2O$. In another embodiment, the hydrotalcite like compound is $Mg_6Al_2(OH)_{18} \cdot 4.5H_2O$.

The shaped bodies of the invention can comprise a support. Exemplary supports include spinels, hydrotalcite like compounds, magnesium acetate, magnesium nitrate, magnesium chloride, magnesium hydroxide, magnesium carbonate, magnesium formate, aluminum titanate, zinc titanate, aluminum zirconate, calcium oxide, calcium aluminate, aluminum nitrohydrate, aluminum hydroxide compound, aluminum-containing metal oxide compound (e.g., other than alumina or aluminum hydroxide compounds), aluminum chlorohydrate, titania, zirconia, clay (e.g., halloysite, rectorite, hectorite, montmorillinite, synthetic montmorillinite, sepiolite, activated sepiolite, kaolin), clay phosphate material, zeolite, or a mixture of two or more thereof. In one embodiment, the support is zinc titanate, zinc aluminate, or zinc titanate/zinc aluminate. Methods for making such compositions are described, for example, in WO 99/42201, the disclosure of which is incorporated by reference herein in its entirety.

In another embodiment, the invention provides methods for reducing SOx emissions, NOx emissions and/or CO emissions from a fluid catalytic cracking unit by adding the shaped bodies described herein to an FCC unit to reduce the CO, SOx and/or NOx emissions from the FCC unit. The shaped bodies are preferably added to the regenerator of the FCC unit.

The shaped bodies of the invention can be added to any conventional reactor-regenerator systems, to ebullating catalyst bed systems, to systems which involve continuously conveying or circulating catalysts/additives between reaction zone and regeneration zone and the like. Circulating bed systems are preferred. Typical of the circulating bed systems are the conventional moving bed and fluidized bed reactor-regenerator systems. Both of these circulating bed systems are conventionally used in hydrocarbon conversion (e.g., hydrocarbon cracking) operations with the fluidized catalyst bed reactor-regenerator systems being preferred.

To reduce the CO, SOx, and/or NOx from the FCC unit, the shaped bodies described herein are introduced into the regenerator of the FCC unit and are continuously cycled between the FCC reactor and the regenerator. The shaped bodies described herein can be used in an amount of least 2 ppm; in an amount of at least about 5% of the inventory of the regenerator; or in an amount of at least about 10% of the inventory of the regenerator.

In another embodiment, the shaped bodies described herein can be used as catalysts in reactions known in the art, such as, for example, basic catalysis (e.g., polymerization of alkene oxides, aldol condensation of aldehydes and ketones); reforming of hydrocarbons (e.g., naphtha and $CH_4$) with water; hydrogenation reactions (e.g., producing $CH_4$, $CH_3OH$, higher alcohols, paraffins and olefins from syngas, hydrogenation of nitrobenzene); oxidation reactions; support for Ziegler-Natta catalysts, and other applications where particle strength is of importance.

In another embodiment, the shaped bodies of the invention can be used in effective amounts as flame retardants.

In another embodiment, the shaped bodies of the invention can be used as molding agents. For example, the shaped bodies of the invention can be used to produce molded heat-resistant electrical insulating parts, such as switch boards, capacitors, insulation wires, and the like.

In still other embodiments, the shaped bodies of the invention can be used as corrosion inhibitors in paints and coating compositions or spacer sheets for electrolytic capacitors.

In still other embodiments, the shaped bodies of the invention can be used as supports for other metals, such as silver, gold, zinc, cadmium, silicon, germanium, tin, lead, chromium, molybdenum, tungsten, sulfur, selenium, tellurium, manganese, rhenium, iron, cobalt, nickel, ruthenium, rhodium, palladium, osmium, iridium, platinum, cerium, copper, titanium, bismuth, antimony, niobium, tantalum, vanadium, antimony, or mixtures of two or more thereof. The metals can be in an elemental state and/or can be in the form of oxides, sulfides and/or halides. In one embodiment, the shaped bodies of the invention are used as a support for copper (e.g., CuO), cobalt (e.g., CoO), vanadium (e.g., $V_2O_5$), titanium ($TiO_2$), lanthanum ($La_2O_3$), cerium (e.g., $CeO_2$), tungsten, or a mixture of two or more thereof.

In yet another embodiment, the shaped bodies of the invention can be used in therapeutically effective amounts in pharmaceutical compositions to treat patients having gastrointestinal disorders. The pharmaceutical compositions are preferably orally administered in solid dosage forms such as, for example, tablets, capsules, or the like.

EXAMPLES

The following examples are for purposes of illustration only and are not intended to limit the scope of the claims appended hereto.

Example 1

MgO powder (having a surface area of about 100 m²/g) (MAGOX®, Premier Chemicals, Cleveland, Ohio) was slurried in water at a solids level of about 14%. Thereafter, 5.2% technical grade acetic acid was added to the MgO slurry.

Separately, pseudoboehmite (P2® Condea) was dispersed in water at a solids level of 8% to produce an alumina sol.

The MgO slurry and alumina sol were mixed in a container such that the molar ratio of Mg/Al of the preparation was 2.5. Additional water was added such that the resulting solids content of the mixture was about 9.5%. The mixture was heated to about 214° F. over a period of about 5 hours. A slurry sample was taken from the mixture and analyzed, as discussed below. The slurry sample was then spray-dried and the spray-dried particles were calcined at a temperature of 550° C. for an hour.

Immediately following preparation of the mixture, a sample was taken from the mixture, and the XRD of the sample is shown in FIG. 1.

Figure 2:
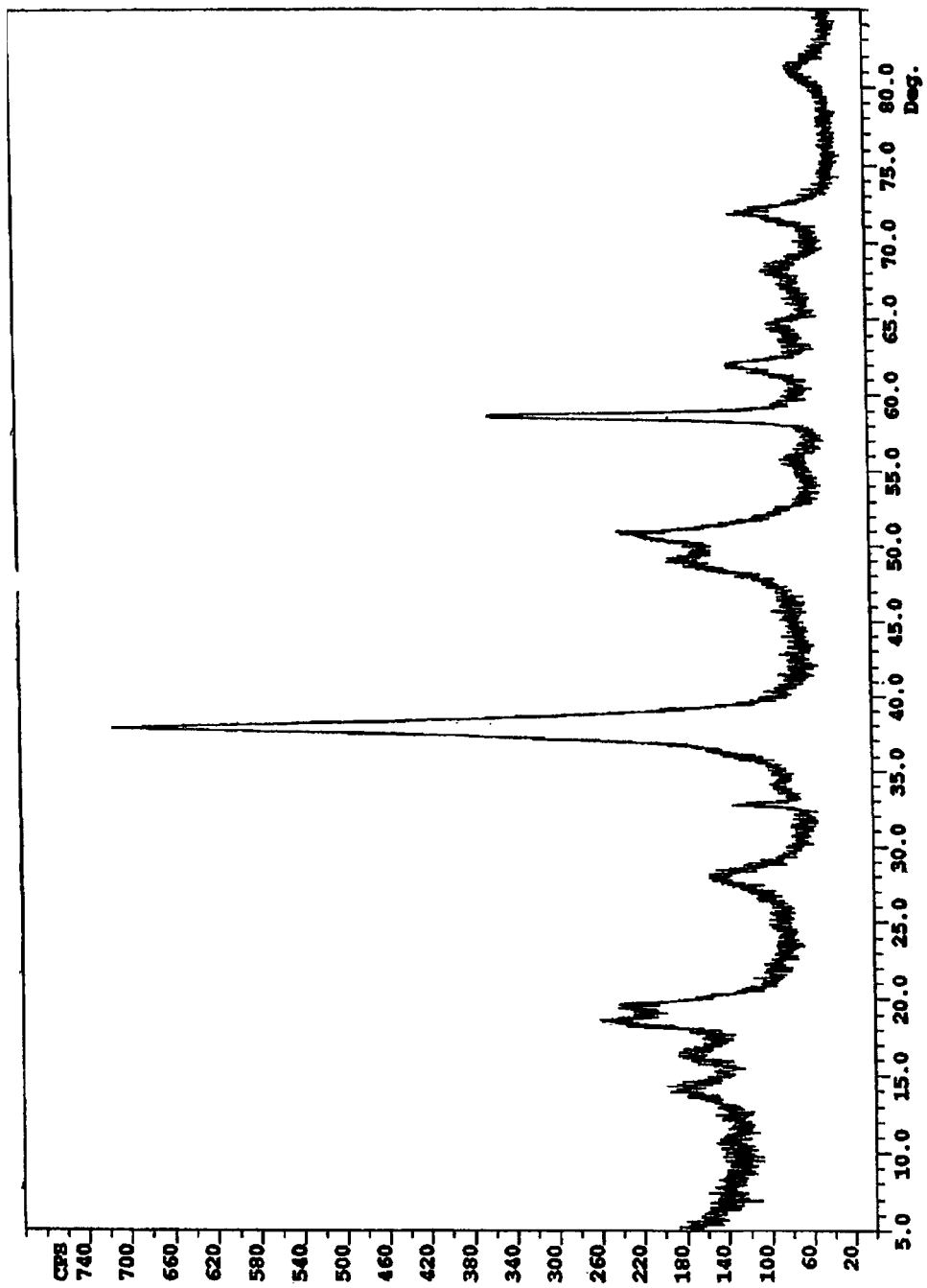
FIG. 2 is the XRD of a dried magnesium aluminate compound that is a precursor to a hydrotalcite like compound where the ratio of Mg/Al is 2.5.

The sample was then spray dried (i.e., at a temperature of 400° C. at the inlet and 150° C. at the outlet) and the XRD thereof is shown in FIG. 2.

Figure 3:
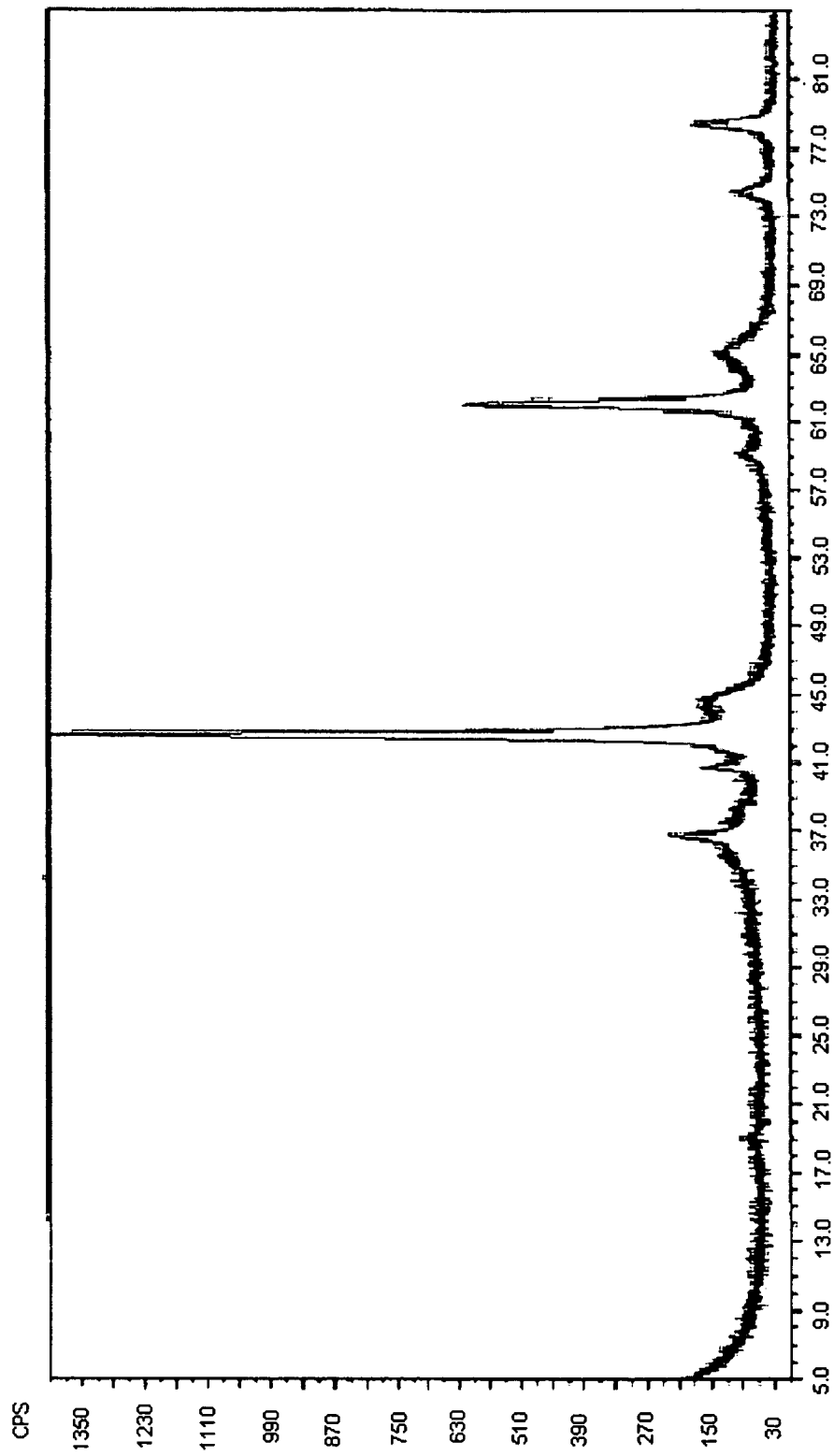
FIG. 3 is the XRD of a slurry of a calcined magnesium aluminate compound that is a precursor to a hydrotalcite like compound where the ratio of Mg/Al is 2.5.

The sample was then calcined at a temperature of 550° C. for 1 hour and the XRD thereof is shown in FIG. 3.

Example 2

Magnesium aluminate compounds that are precursors to hydrotalcite like compounds were prepared following the methods described herein and in U.S. Pat. No. 6,028,023, the disclosure of which is incorporated by reference herein in its entirety.

Figure 4:
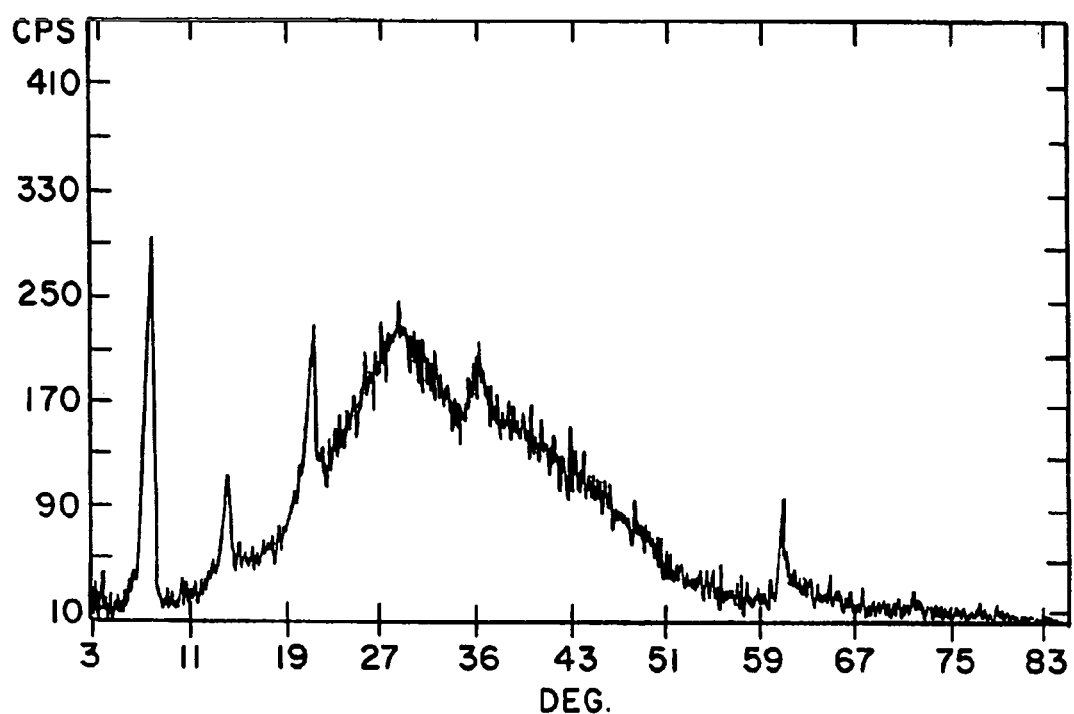
FIG. 4 is an XRD pattern for a magnesium aluminate compound having a Mg:Al ratio of 2:1 wherein the slurry has been heated in step (b) at a temperature of about 80-85° C.
Figure 5:
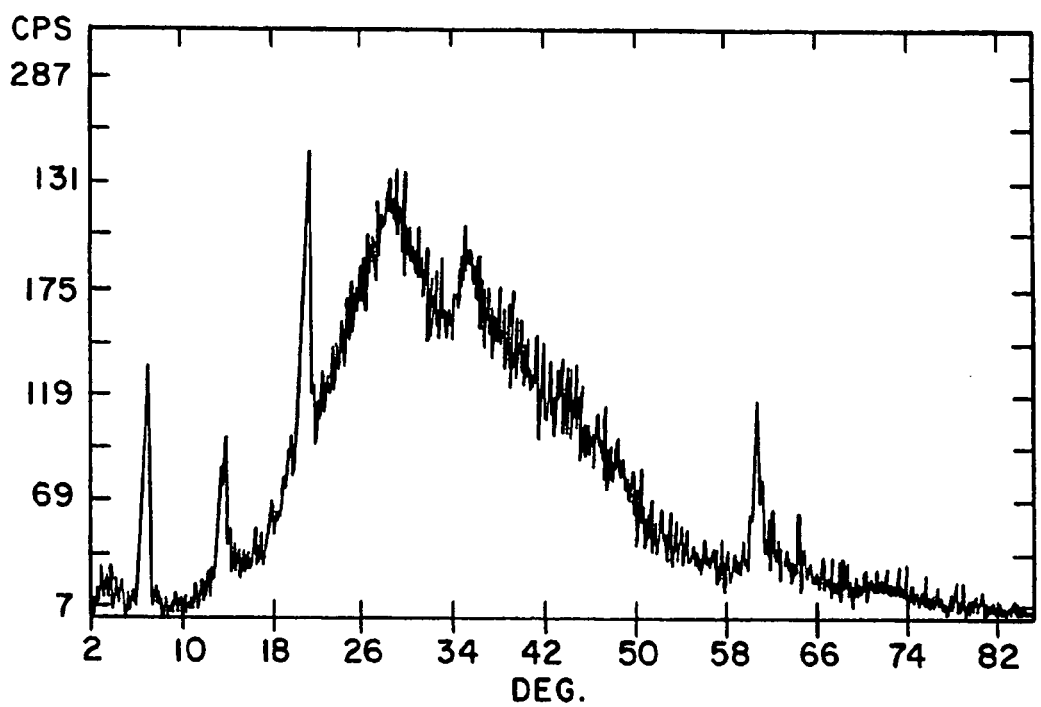
FIG. 5 is an XRD pattern for a magnesium aluminate compound having a Mg:Al ratio of 2:1 wherein the slurry has been heated in step (b) at a temperature of about 80-85° C. for a longer period of time than the magnesium aluminate compound shown in FIG. 4.
Figure 6:
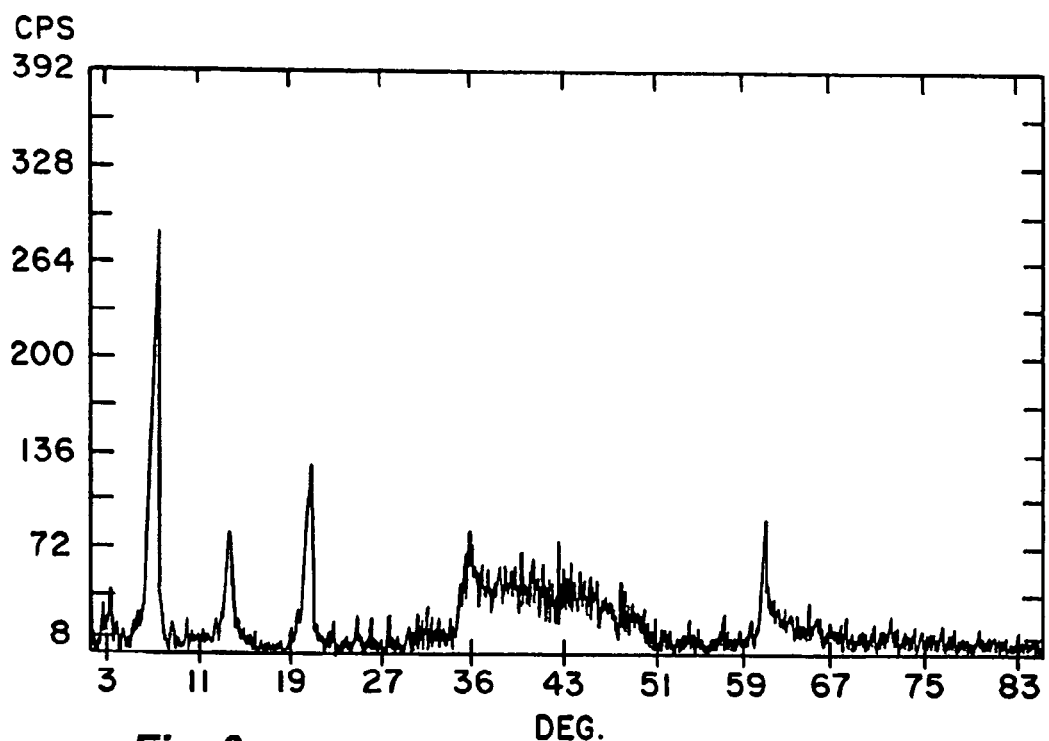
FIG. 6 shows the crystalline portion of the phase shown in FIG. 4, where the amorphous material in FIG. 4 was subtracted out of the XRD pattern.

An X-ray diffraction pattern for an exemplary magnesium aluminate that is a precursor to a hydrotalcite like compound, where the ratio of magnesium to aluminum is 2:1, is shown in FIGS. 4 and 5. The magnesium aluminate was heat treated (i.e., step (b) above) at a temperature of about 80-85° C. FIG. 6 shows the crystalline portion of the phase that was shown in FIG. 4, where the amorphous material present in FIG. 4 was subtracted out of the XRD pattern shown in FIG. 6.

Figure 7:
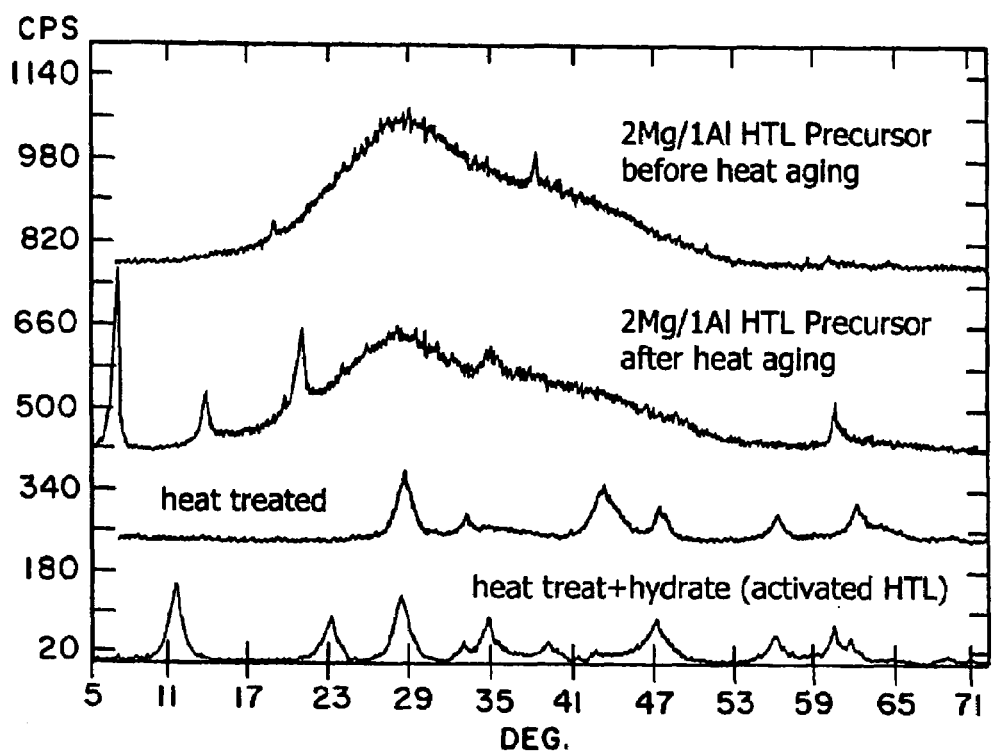
FIG. 7 shows the XRD patterns for magnesium aluminate compounds of the invention during various stages of preparation. The bottom XRD pattern in FIG. 7 is of a hydrotalcite like compound.

FIG. 7 shows the changes in crystal structure at various steps in the process described herein. The top XRD pattern (labeled "2Mg/1Al HTL Precursor before heat aging") shows the product of step (a) of the process described herein, prior to undertaking step (b) for a magnesium aluminate compound having a magnesium to aluminum ratio of 2:1. The second XRD pattern from the top (labeled "2Mg/1Al HTL Precursor after heat aging") shows the product of step (b) of the process described herein. The third XRD pattern from the top (labeled "heat treated") shows the product of the calcination step (d) of the process described herein.

The bottom XRD pattern in FIG. 7 (labeled "heat treat+ hydrate (activated HTL)") shows the XRD pattern for a hydrotalcite like compound, as evidenced by the peaks at about 11.271 degrees, about 22.7 degrees and about 34.4 degrees. FIG. 7 includes the effects of the $CeO_2$ component that was added during the synthesis reaction and whose most prominent peaks manifest themselves at 28.6 degrees, 47.5 degrees and 56.3 degrees. This XRD pattern demonstrates that the magnesium aluminate compounds of the invention are precursors to hydrotalcite like compounds.

Figure 8:
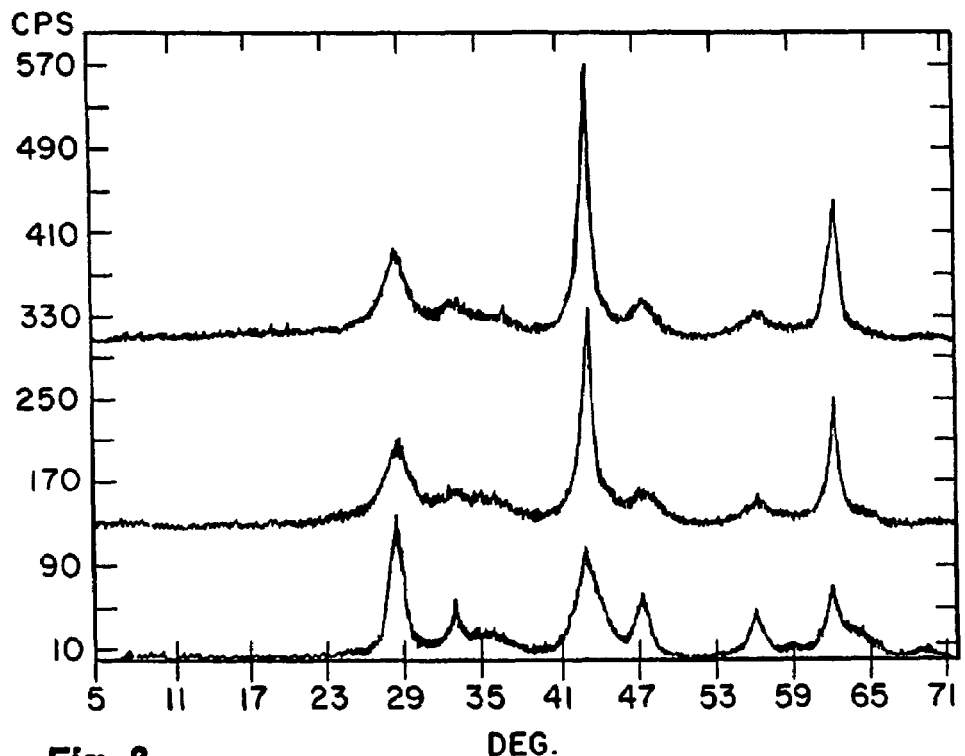
FIG. 8 shows the XRD patterns for calcined magnesium aluminate compounds that are precursors to hydrotalcite like compounds. The calcined magnesium aluminate compounds have Mg:Al ratios, from top to bottom, of 2:1, 3:1 and 5:1.

FIG. 8 shows the XRD pattern for magnesium aluminate compounds that are precursors to hydrotalcite like compounds following calcination step (d) of the process described herein, where the calcination step was conducted at a temperature of 500° C. for one hour. The top XRD pattern is for a magnesium aluminate compound having a Mg to Al ratio of 2:1. The middle XRD pattern is for a magnesium aluminate compound having a Mg to Al ratio of 3:1. The bottom XRD pattern is for a magnesium aluminate compound having a Mg to Al ratio of 5:1.

Example 3

For comparative purposes, a magnesium aluminum composition was prepared with a 0.5 Mg to Al ratio and including oxidants of cerium and vanadium oxides. On a loss free basis, the relative proportions of $Al_2O_3$, MgO, $CeO_2$, and $V_2O_5$ were 57.0, 22.5, 16.0, and 8.5 wt %. The composition was prepared by dispersing 1119 g of pseudoboehmite (P2® Condea) in 6461 g water under vigorous agitation conditions. Separately, 106 g acetic acid, 2492 g water and 321 g magnesium oxide powder (MAGOX, Premier Chemicals) were mixed together. Upon completion, the alumina sol was added to the magnesium oxide slurry along with 6000 g water. Once the mixture was homogenously mixed, 456 g vanadium oxalate solution and 774 g cerium nitrate solution were added and mixed for 10 minutes. The resulting slurry was spray-dried to produce mirospheroidal particles. Following spray-drying, the powder was calcined in a box furnace at 600° C. for one hour.

Figure 9:
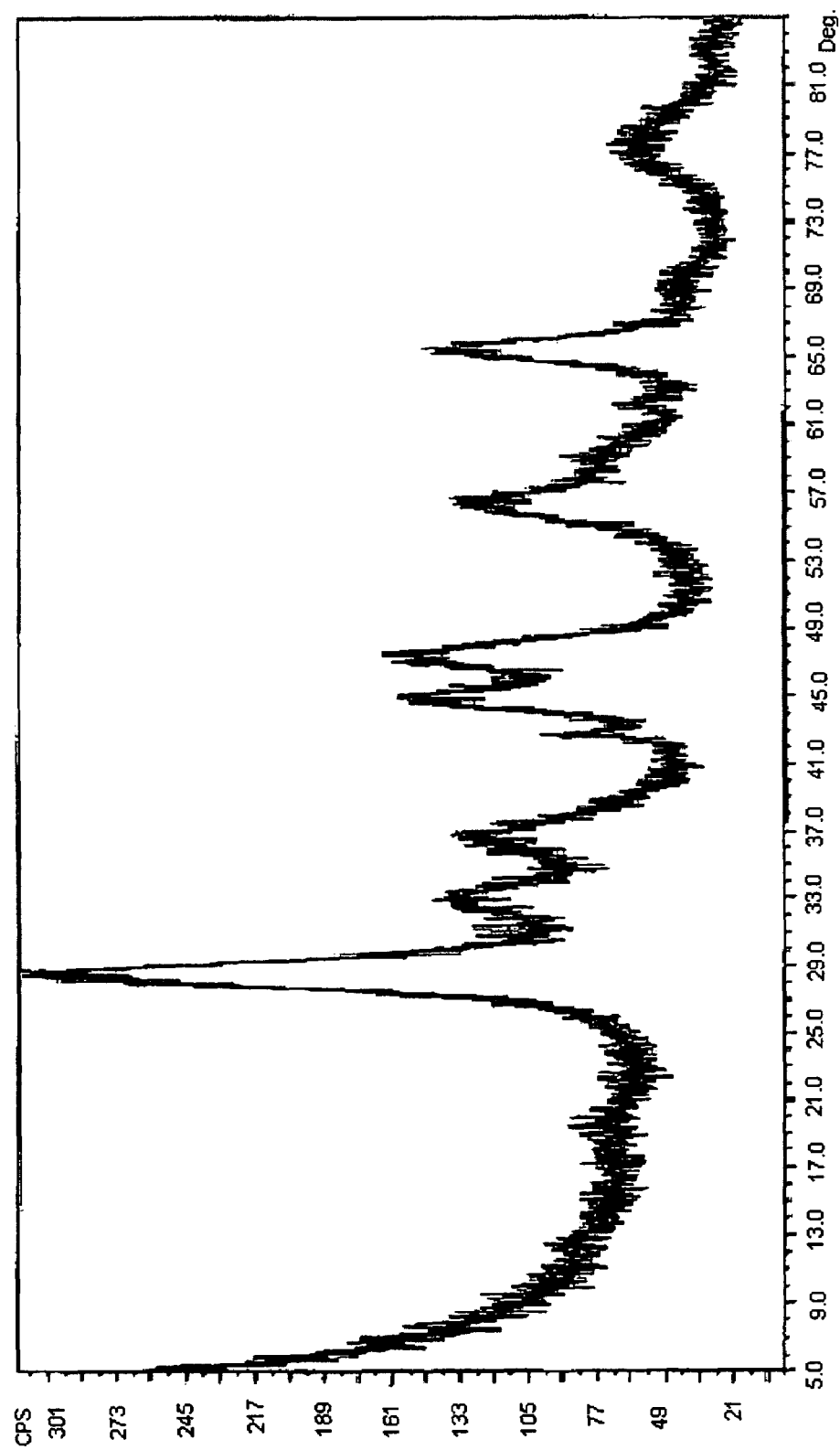
FIG. 9 shows the XRD pattern for a 0.5 Mg to Al spinel compound, produced as a comparative example.

As shown in FIG. 9, X-ray diffraction analysis was performed on the resulting powder and showed the predominant magnesium aluminum compound to be of the spinel phase, as described in U.S. Pat. Nos. 4,469,589 and 4,472,267.

Example 4

For comparative purposes, a magnesium aluminum composition was prepared with a 0.8 Mg to Al ratio and including oxidants of cerium and vanadium oxides. On a loss free basis, the relative proportions of $Al_2O_3$, MgO, $CeO_2$, and $V_2O_5$ were 48.7, 30.8, 16.0, and 4.5 wt %. The composition was prepared by dispersing 638 g of pseudoboehmite (Condea P2) in 3044 g water under vigorous agitation conditions. Separately, 97 g acetic acid, 2272 g water and 292.8 g magnesium oxide (MAGOX, Premier Chemicals) powder were mixed together. Upon completion, the alumina sol was added to the magnesium oxide slurry along with 4000 g water. Once the mixture was homogenously mixed, 304 g vanadium oxalate solution and 516 g cerium nitrate solution were added and mixed for 10 minutes. The resulting slurry was spray-dried to produce microspheroidal particles. Following spray-drying, the powder was calcined in a box furnace at 600° C. for one hour.

Figure 10:
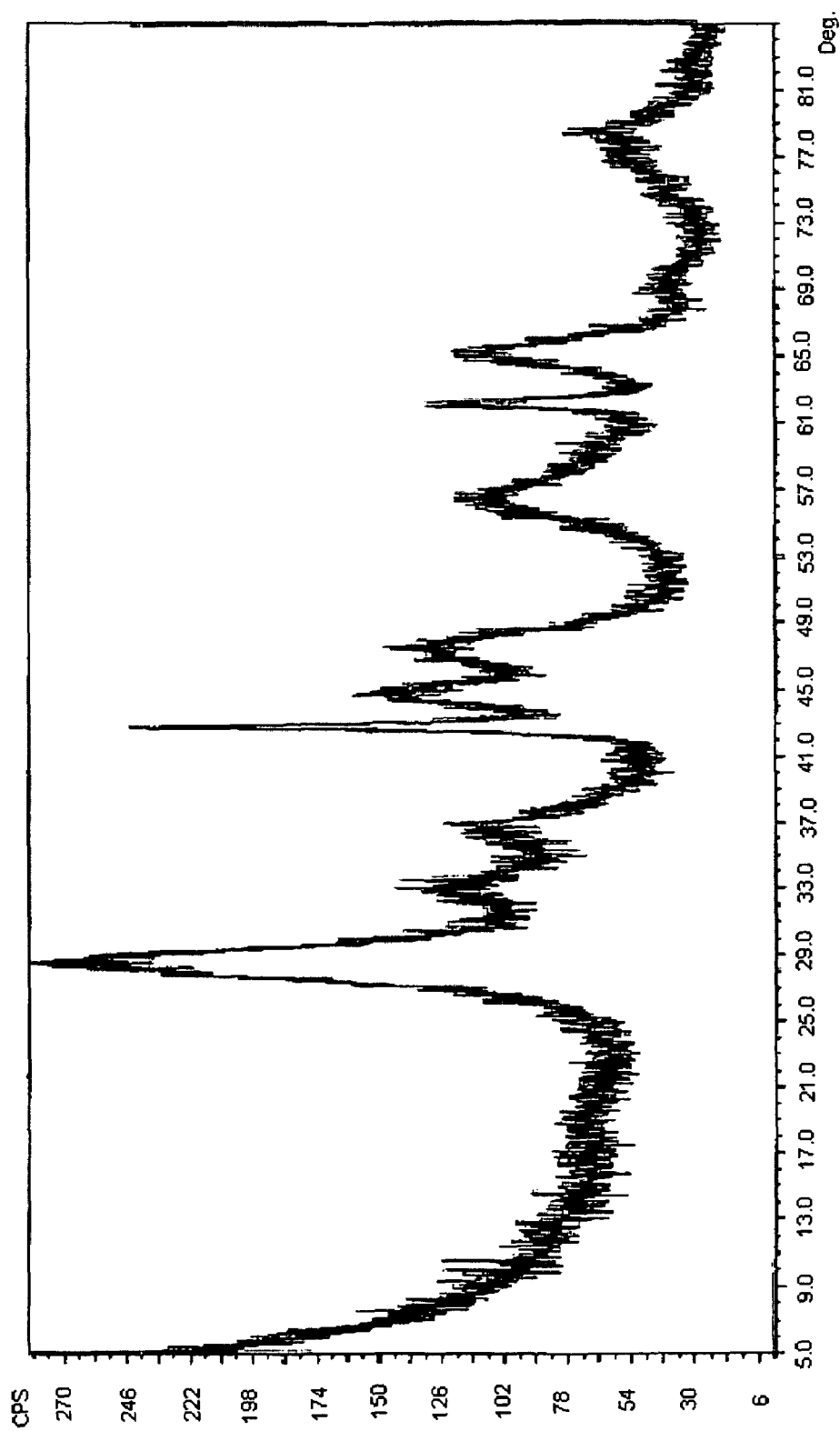
FIG. 10 shows the XRD pattern for a 0.8 Mg to Al spinel compound, produced as a comparative example.

As shown in FIG. 10, X-ray diffraction analysis was performed on the resulting powder and showed the predominant magnesium aluminum compound to be of the spinel phase, as described in U.S. Pat. Nos. 4,469,589 and 4,472, 267. Also present was a small amount of the magnesium aluminum oxide of the present invention.

Example 5

A magnesium aluminum composition was prepared with a 3.0 Mg to Al ratio, and including oxidants of cerium and vanadium oxides. On a loss free basis, the relative proportions of $Al_2O_3$, MgO, $CeO_2$, and $V_2O_5$ were 23.6, 55.9, 16.0, and 4.5 wt %. The composition was prepared by dispersing 309 g of pseudoboehmite (Condea P2) in 1473 g water under vigorous agitation conditions. Separately, 176 g acetic acid, 4124 g water and 532 g magnesium oxide powder (MAGOX, Premier Chemicals) were mixed together. Upon completion, the alumina sol was added to the magnesium oxide slurry along with 1600 g water. Once the mixture was homogenously mixed, 304 g vanadium oxalate solution and 516 g cerium nitrate solution were added and mixed for five minutes. The resulting slurry was spray-dried to produce microspheroidal particles. Following spray drying, the powder was calcined in a box furnace at 600° C. for one hour.

Figure 11:
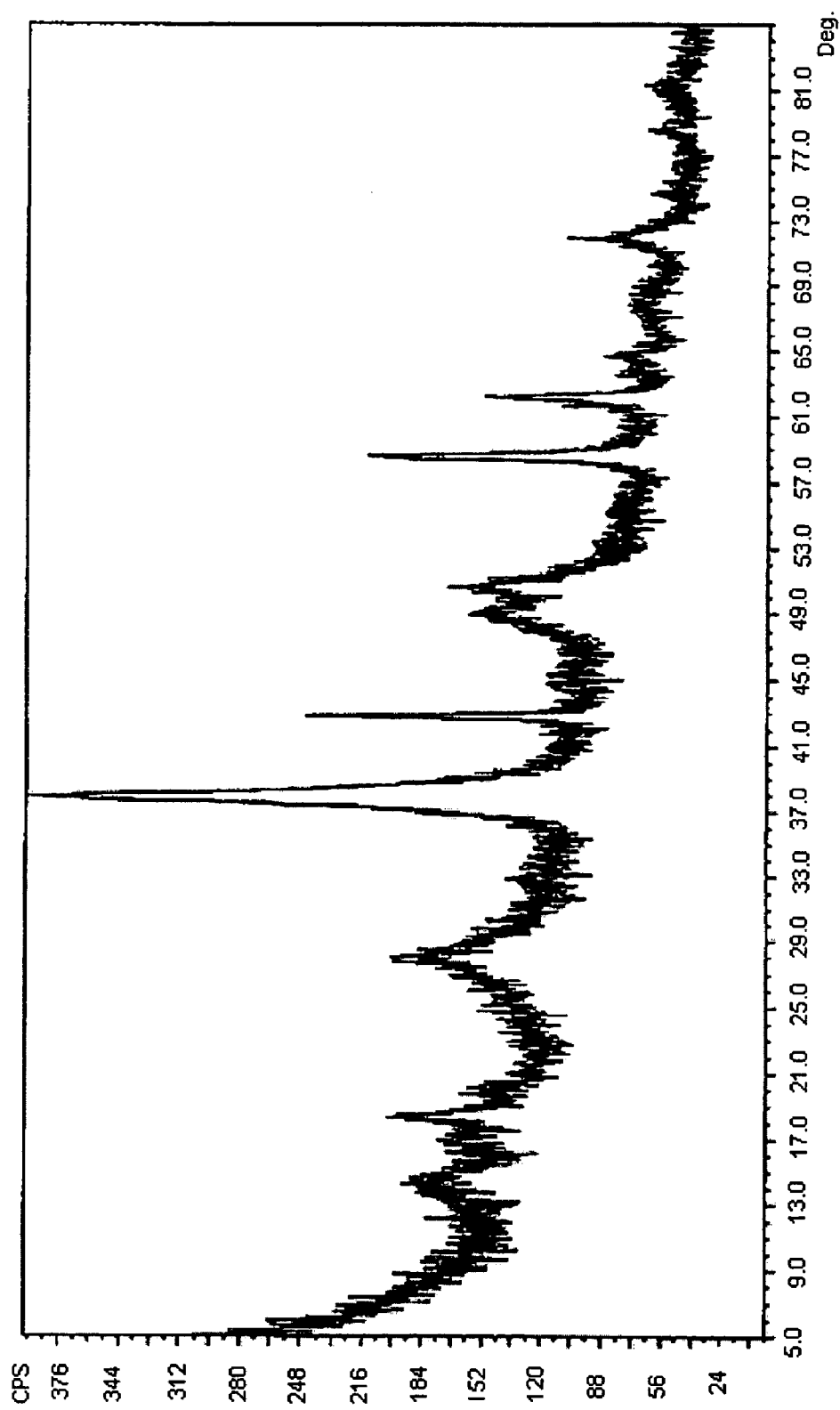
FIG. 11 shows the XRD pattern for a 3.0 Mg to Al spray-dried composition of the present invention.
Figure 12:
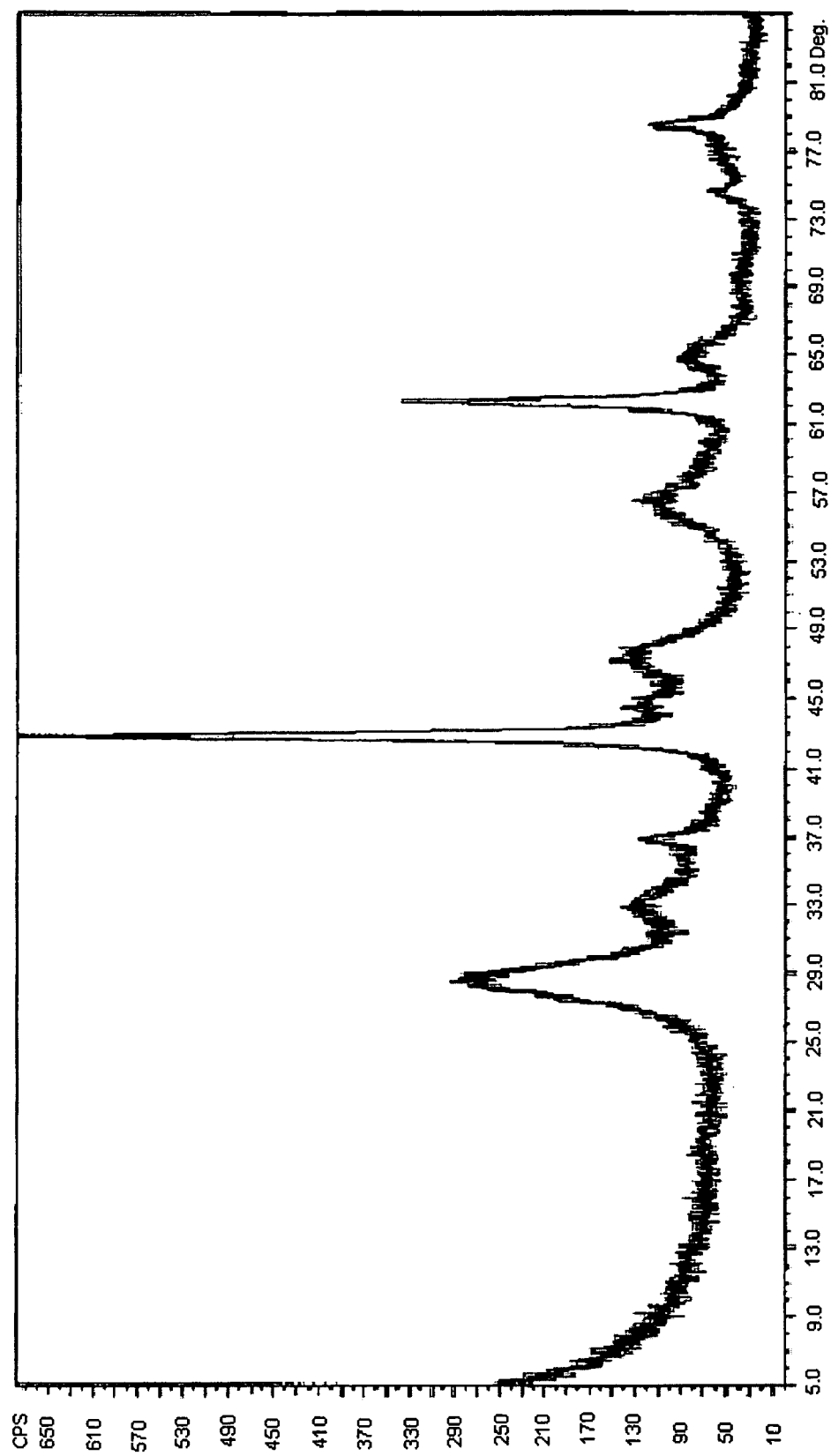
FIG. 12 shows the XRD pattern for a 3.0 Mg to Al composition of the present invention that was calcined at 600° C.

X-ray diffraction analysis was performed on the resulting spray dried and calcined powders (FIGS. 11 and 12). Following spray drying, no hydrotalcite-like phases were observed. The predominant crystalline phases were attributed to magnesium hydroxide, $Mg(OH)_2$ and pseudoboehmite alumina, $AlOOH.xH_2O$, as shown in FIG. 11. As shown in FIG. 12, upon calcination at 600° C., the individual phases transformed into a predominant phase of magnesium aluminum oxide exhibiting the periclase crystal structure similar to MgO.

Example 6

To determine the performance of compositions of the instant invention as compared to compositions prepared according to the teachings of U.S. Pat. No. 6,028,023, a portion of the calcined product of Example 5 was further hydrated with water to produce a hydrotalcite-like phase. The x-ray diffraction pattern showed that in addition to the cerium oxide oxidant phase, the predominant magnesium aluminum phase was most closely represented by $Mg_6Al_2OH_{18}.4.5H_2O$, as depicted in ICDD card 35-965. As more fully described in the U.S. Pat. No. 6,028,023 patent, this phase is a hydrotalcite-like compound.

Example 7

A magnesium aluminum composition was prepared with a 4.0 Mg to Al ratio, and including oxidants of cerium and vanadium oxides. On a loss free basis, the relative proportions of $Al_2O_3$, MgO, $CeO_2$, and $V_2O_5$ were 19.1, 60.4, 16.0, and 4.5 wt %. The composition was prepared by dispersing 172 g of pseudoboehmite (Condea P2) in 822 g water under vigorous agitation conditions. Separately, 182 g acetic acid, 4258 g water and 549 g magnesium oxide powder (MAGOX, Premier Chemicals) were mixed together. Upon completion, the alumina sol was added to the magnesium oxide slurry along with 1600 g water. Once the mixture was homogenously mixed, 304 g vanadium oxalate solution and 516 g cerium nitrate solution were added and mixed for five minutes. The resulting slurry was spray-dried to produce microspheroidal particles. Following spray drying, the powder was calcined in a box furnace at 600° C. for one hour.

Figure 13:
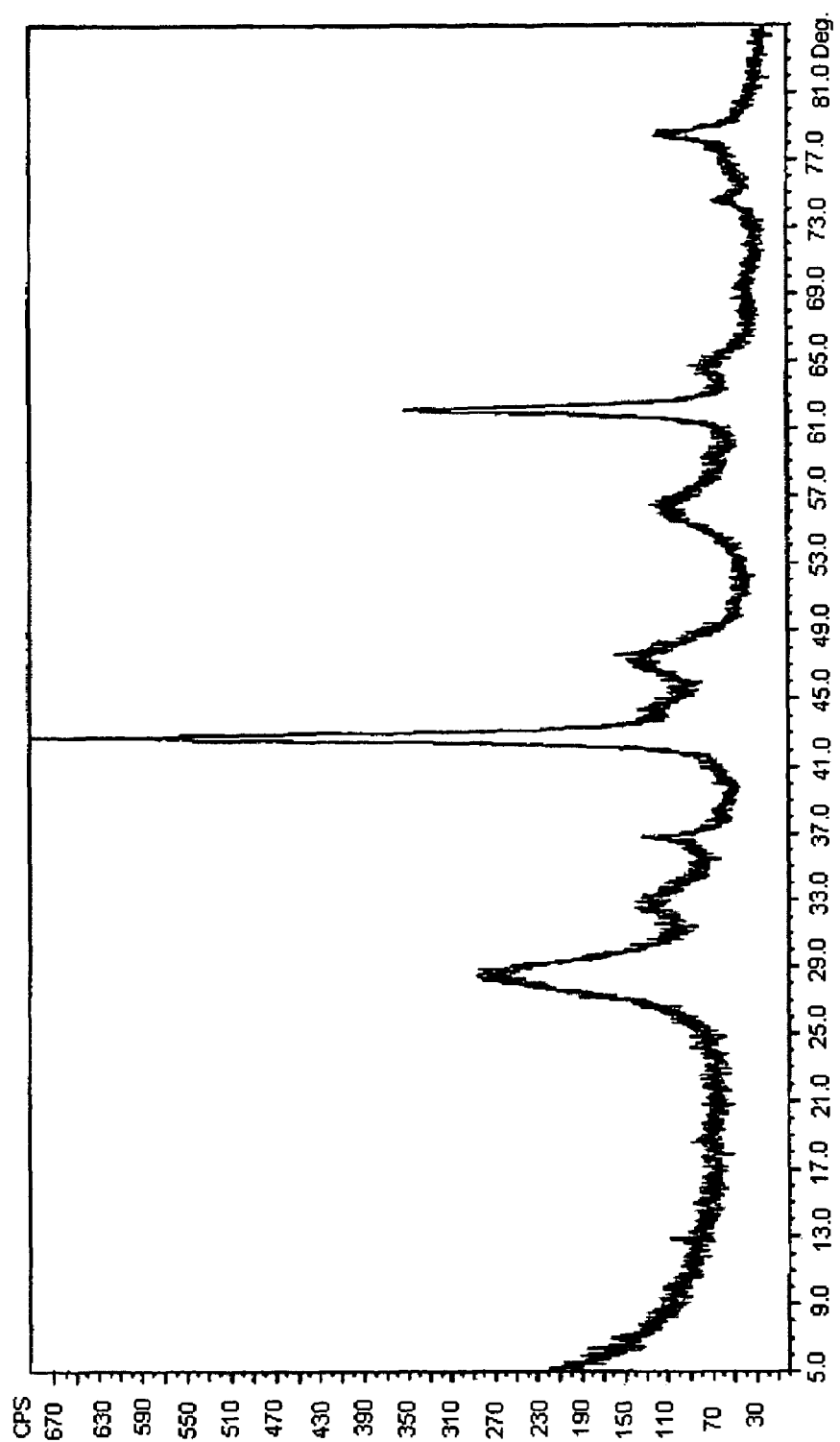
FIG. 13 shows the XRD pattern for a 4.0 Mg to Al composition of the present invention that was calcined at 600° C.

X-ray diffraction analysis was performed on the resulting powder. As shown in FIG. 13, upon calcination at 600° C., the individual phases transformed into a predominant phase of magnesium aluminum oxide exhibiting the periclase crystal structure similar to MgO. Also present was cerium oxide, $CeO_2$.

Example 8

$SO_2$ Performance Test

To evaluate the performance of the instant invention as compared to that of the prior art, a test was performed in which a 75 mg sample of each of the products as prepared in Examples 3-6 was introduced to a fixed fluid bed reactor containing 5 g of a clay-containing microsphere based inert material. The reactor was heated to 700° C. and allowed to equilibrate, after which a $SO_2$-containing gas was introduced into the reactor. The approximate composition of the test gas was 1998 ppm $SO_2$, 1% $O_2$, and 4.96% $CO_2$ in each case. The flow-rate through the reactor was maintained at 130 cc/minute. The exit of the reactor was continuously monitored for $SO_2$ during the 24-hour test period. The $SO_2$ values and the total $SO_2$ pickup as calculated by integrating the $SO_2$ pickup during the entire 24-hour test period are set forth in Table 1 below.

TABLE 1

$SO_2$ Performance Test Results

| Example | Description | $SO_2$ at 1000 sec (ppm) | 24 hr Sorption (ppm · hrs) |
|---------|-------------|--------------------------|----------------------------|
| 3 | 0.5 Mg to Al | 395 | 2423 |
| 4 | 0.8 Mg to Al | 208 | 2482 |
| 5 | 3.0 Mg to Al | 64 | 5022 |
| 6 | Hydrated sample of Example 5[a] | 125 | 4700 |
| 7 | 4.0 Mg to Al | 64 | 5424 |

[a] For example 6, an additional quantity of material was introduced into the test reactor to obtain a sorbent concentration comparable to that of Example 5.

The results of the performance test show that the $SO_2$ pickup and overall pickup capacity are much greater for Examples 5 and 7 according to the present invention as compared with either spinel or hydrotalcite derived compositions.

The performance of the mixed metal oxide of Examples 5 and 7 are found to have nearly twice the sorption capacity as those based on the spinel of Examples 3 and 4. Compounds of the present invention are accordingly very useful to refiners which are required to control $SO_2$ levels with a minimum amount of SOx-absorbing additive. Additionally, the initial rate of $SO_2$ pickup is significantly greater than prior art compositions as indicated by the $SO_2$ level remaining at a low level of 64 ppm after 1000 seconds of the test as compared with 125 ppm for the collapsed hydrotalcite-like compound and 208-395 ppm for the compositions containing a predominance of spinel. Rapid pickup of $SO_2$ is particularly useful for refiners who experience a sudden increase in $SO_2$ levels due to a feed change or equipment malfunction and require rapid response from the SOx additive.

Example 9

NOx Reduction

A reactor unit is used to measure NOx reduction. NOx emissions from the reactor unit are measured as close as practical to the beginning and at the end of the reactor unit prior to adding the composition of the invention to the reactor unit. The composition of the invention is then added. After the composition of the invention is added, the NOx emissions are measured as close as practical to the beginning and at the end of the reactor unit. The compositions of the invention reduce NOx emissions from the reactor unit.

Example 10

CO Reduction

A reactor unit is used to measure CO reduction. CO emissions from the reactor unit are measured as close as practical to the beginning and at the end of the reactor unit prior to adding the composition of the invention to the reactor unit. The composition of the invention is then added. After the composition of the invention is added, the CO emissions are measured as close as practical to the beginning and at the end of the reactor unit. The compositions of the invention reduce CO emissions from the reactor unit.

Various modifications of the invention, in addition to those described herein, will be apparent to one skilled in the art from the foregoing description. Such modifications are understood to fall within the scope of the appended claims.

What is claimed is:

1. A method for reducing SOx, NOx, or CO emissions from a fluid stream comprising contacting the fluid stream with a material comprising magnesium and aluminum and having an X-ray diffraction pattern displaying at least a reflection at a two theta peak position at about 43 degrees and about 62 degrees, wherein the ratio of magnesium to aluminum in the material is from about 1:1 to about 10:1.

2. The method of claim 1, where the material is heated prior to contacting the compound with the fluid stream.

3. The method of claim 1, wherein the ratio of magnesium to aluminum is about 1:1 to about 6:1.

4. The method of claim 1, wherein the ratio of magnesium to aluminum is about 1.5:1 to about 10:1.

5. The method of claim 4, wherein the ratio of magnesium to aluminum is about 1.5:1 to about 6:1.

6. The method of claim 5, wherein the ratio of magnesium to aluminum is about 1.8:1 to about 5:1.

7. The method of claim 6, wherein the ratio of magnesium to aluminum is about 2:1 to about 4:1.

8. The method of claim 1, wherein the material is a shaped body.

9. The method of claim 8, wherein the shaped body is a dried shaped body.

10. The method of claim 8, wherein the shaped body is a calcined shaped body.

11. The method of claim 1, wherein the material comprises magnesium in an amount of about 40% or more by weight, calculated as the oxide equivalent.

12. The method of claim 1, wherein the material further comprises at least one metallic oxidant.

13. The method of claim 12, wherein the metal in the metallic oxidant is antimony, bismuth, cadmium, cerium, chromium, cobalt, copper, dysprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof.

14. The method of claim 1, wherein the material further comprises a support.

15. The method of claim 14, wherein the support comprises a spinel, hydrotalcite like compound, magnesium acetate, magnesium nitrate, magnesium chloride, magnesium hydroxide, magnesium carbonate, magnesium formate, aluminum titanate, zinc titanate, aluminum zirconate, calcium oxide, calcium aluminate, aluminum nitrohydrate, aluminum hydroxide compound, aluminum-containing metal oxide compound, aluminum chlorohydrate, titania, zirconia, clay, clay phosphate material, zeolite, or a mixture of two or more thereof.

16. The method of claim 14, wherein the support is zinc titanate, zinc aluminate, or zinc titanate/zinc aluminate.

17. The method of claim 1, wherein the fluid stream is a fluid stream of an FCC unit.

18. A method for reducing SOx, NOx, or CO emissions from a fluid stream comprising contacting said fluid stream with a compound, wherein the compound comprises (i) a material comprising magnesium and aluminum and having an X-ray diffraction pattern displaying at least a reflection at a two theta peak position at about 43 degrees and about 62 degrees, wherein the ratio of magnesium to aluminum in the material is from about 1:1 to about 10:1, and (ii) about 1 wt % to about 75 wt % of a hydrotalcite like compound.

19. The method of claim 18, where the compound is heated prior to contacting the compound with the fluid stream.

20. The method of claim 18, wherein the ratio of magnesium to aluminum is about 1:1 to about 6:1.

21. The method of claim 18, wherein the ratio of magnesium to aluminum is about 1.5:1 to about 10:1.

22. The method of claim 21, wherein the ratio of magnesium to aluminum is about 1.5:1 to about 6:1.

23. The method of claim 22, wherein the ratio of magnesium to aluminum is about 1.8:1 to about 5:1.

24. The method of claim 23, wherein the ratio of magnesium to aluminum is about 2:1 to about 4:1.

25. The method of claim 18, wherein the compound is a shaped body.

26. The method of claim 25, wherein the shaped body is a dried shaped body.

27. The method of claim 25, wherein the shaped body is a calcined shaped body.

28. The method of claim 18, wherein the material comprises magnesium in an amount of about 40% or more by weight, calculated as the oxide equivalent.

29. The method of claim 18, wherein the compound comprises (i) about 99 wt % to about 50 wt % of a material comprising magnesium and aluminum and having an X-ray diffraction pattern displaying at least a reflection at a two theta peak position at about 43 degrees and about 62 degrees, wherein the ratio of magnesium to aluminum in the material is from about 1:1 to about 10:1, and (ii) about 1 wt % to about 50 wt % of a hydrotalcite like compound.

30. The method of claim 29, wherein the ratio of magnesium to aluminum in the material is from about 1:1 to about 6:1.

31. The method of claim 29, wherein the ratio of magnesium to aluminum in the material is from about 1.5:1 to about 10:1.

32. The method of claim 31, wherein the ratio of magnesium to aluminum in the material is from about 1.5:1 to about 6:1.

33. The method of claim 29, wherein the compound comprises (i) about 99 wt % to about 75 wt % of a material comprising magnesium and aluminum and having an X-ray diffraction pattern displaying at least a reflection at a two theta peak position at about 43 degrees and about 62 degrees, wherein the ratio of magnesium to aluminum in the material is from about 1:1 to about 10:1, and (ii) about 1 wt % to about 25 wt % of a hydrotalcite like compound.

34. The method of claim 33, wherein the ratio of magnesium to aluminum in the material is from about 1:1 to about 6:1.

35. The method of claim 33, wherein the ratio of magnesium to aluminum in the material is from about 1.5:1 to about 10:1.

36. The method of claim 35, wherein the ratio of magnesium to aluminum in the material is from about 1.5:1 to about 6:1.

37. The method of claim 33, wherein the compound comprises (i) about 95 wt % to about 75 wt % of a material comprising magnesium and aluminum and having an X-ray diffraction pattern displaying at least a reflection at a two theta peak position at about 43 degrees and about 62 degrees, wherein the ratio of magnesium to aluminum in the material is from about 1:1 to about 10:1, and (ii) about 5 wt % to about 25 wt % of a hydrotalcite like compound.

38. The method of claim 37, wherein the ratio of magnesium to aluminum in the material is from about 1:1 to about 6:1.

39. The method of claim 37, wherein the ratio of magnesium to aluminum in the material is from about 1.5:1 to about 10:1.

40. The method of claim 39, wherein the ratio of magnesium to aluminum in the material is from about 1.5:1 to about 6:1.

41. The method of claim 18, wherein the compound further comprises at least one metallic oxidant.

42. The method of claim 41, wherein the metal in the metallic oxidant is antimony, bismuth, cadmium, cerium, chromium, cobalt, copper, dysprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof.

43. The method of claim 18, wherein the compound further comprises a support.

44. The method of claim 43, wherein the support comprises a spinel, hydrotalcite like compound, magnesium acetate, magnesium nitrate, magnesium chloride, magnesium hydroxide, magnesium carbonate, magnesium formate, aluminum titanate, zinc titanate, aluminum zirconate, calcium oxide, calcium aluminate, aluminum nitrohydrate, aluminum hydroxide compound, aluminum-containing metal oxide compound, aluminum chlorohydrate, titania, zirconia, clay, clay phosphate material, zeolite, or a mixture of two or more thereof.

45. The method of claim 44, wherein the support is zinc titanate, zinc aluminate, or zinc titanate/zinc aluminate.

46. The method of claim 18, wherein the fluid stream is a fluid stream of an FCC unit.

* * * * *

UNITED STATES PATENT AND TRADEMARK OFFICE
CERTIFICATE OF CORRECTION

PATENT NO. : 7,361,319 B2  
APPLICATION NO. : 10/995583  
DATED : April 22, 2008  
INVENTOR(S) : Vierheilig Page 1 of 1

It is certified that error appears in the above-identified patent and that said Letters Patent is hereby corrected as shown below:

Column 3, line 35, delete "C." and insert instead --C--.

Column 8, lines 52 and 59, delete "C." and insert instead --C--.

Column 10, lines 18-21, each time it appears other than at the end of a sentence, delete "C." and insert instead --C--.

Column 10, lines 56-61, each time it appears other than at the end of a sentence, delete "C." and insert instead --C--.

Column 14, line 44, delete "F." and insert instead --F--.

Column 14, lines 48, 53 and 55, each time it appears, delete "C." and insert instead --C--.

Column 17, lines 36-50 (approx), delete TABLE 1 and insert instead:

Table 1. $SO_2$ Performance Test Results

| Example | Description | $SO_2$ at 1000 sec (ppm) | 24 hr Sorption (ppm-hrs) |
|---|---|---|---|
| 3 | 0.5 Mg to Al | 395 | 2423 |
| 4 | 0.8 Mg to Al | 208 | 2482 |
| 5 | 3.0 Mg to Al | 64 | 5022 |
| 6 | Hydrated sample of Example 5* | 125 | 4700 |
| 7 | 4.0 Mg to Al | 64 | 5424 |

*For example 6, an additional quantity of material was introduced into the test reactor to obtain a sorbent concentration comparable to that of Example 5.

Signed and Sealed this

Eighth Day of July, 2008

JON W. DUDAS  
*Director of the United States Patent and Trademark Office*